US010688395B2

(12) United States Patent
Oshino et al.

(10) Patent No.: US 10,688,395 B2
(45) Date of Patent: Jun. 23, 2020

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yosuke Oshino, Kyoto (JP); Yusaku Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/354,391

(22) Filed: Mar. 15, 2019

(65) Prior Publication Data

US 2019/0282905 A1 Sep. 19, 2019

(30) Foreign Application Priority Data

Mar. 16, 2018 (JP) ................................ 2018-049344

(51) Int. Cl.
*A63F 13/00* (2014.01)
*A63F 13/63* (2014.01)
*A63F 13/57* (2014.01)

(52) U.S. Cl.
CPC .............. *A63F 13/63* (2014.09); *A63F 13/57* (2014.09)

(58) Field of Classification Search
None
See application file for complete search history.

(56) References Cited

U.S. PATENT DOCUMENTS

| | | | | |
|---|---|---|---|---|
| 5,287,446 | A * | 2/1994 | Williams | G06F 30/18 345/474 |
| 8,775,953 | B2 * | 7/2014 | Schulz | G06T 3/4038 715/764 |
| 9,449,247 | B2 * | 9/2016 | Yamada | G06T 11/60 |
| 9,814,983 | B2 * | 11/2017 | Johnston | A63F 13/63 |
| 10,155,162 | B2 * | 12/2018 | Dezaki | A63F 13/77 |
| 2001/0040586 | A1 * | 11/2001 | Yokoyama | G09B 9/063 345/672 |
| 2011/0304638 | A1 * | 12/2011 | Johnston | G06T 11/40 345/582 |

(Continued)

OTHER PUBLICATIONS

[Online] "Super Mario Maker", Nintendo Co., Ltd., http://supermariomaker.nintendo.com/make-it/, searched on Feb. 20, 2018—printed Mar. 15, 2019, 8 pages.

*Primary Examiner* — Paul A D'Agostino
(74) *Attorney, Agent, or Firm* — Nixon & Vanderhye PC

(57) ABSTRACT

An example of an information processing apparatus places, as a component object to be used for collision detection, a slope object having a unit portion in a virtual space. An image representing the virtual space in which the component object is placed is generated. The information processing apparatus places a first slope object having one unit portion in the virtual space, based on a first instruction of the user. The unit portion has a first portion and a second portion. The first portion has a first side and a second side that form an interior angle being an acute angle. The information processing apparatus places a second slope object in the virtual space. The second slope object has a continuous unit portion in which a plurality of the unit portions are connected such that a plurality of the first sides thereof are connected to form a single side.

19 Claims, 25 Drawing Sheets

(56) References Cited

U.S. PATENT DOCUMENTS

| | | | | |
|---|---|---|---|---|
| 2012/0169593 | A1* | 7/2012 | Mak | G06F 3/0485 345/157 |
| 2012/0324385 | A1* | 12/2012 | Johnston | A63F 13/63 715/765 |

* cited by examiner

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2018-49344, filed on Mar. 16, 2018, are incorporated herein by reference.

FIELD

The technique shown here relates to a storage medium having stored therein an information processing program, an information processing apparatus, an information processing system, and an information processing method, for placing an object in a virtual space.

BACKGROUND AND SUMMARY

Conventionally, an information processing program for placing an object in a virtual space, based on an instruction of a user, has been known. For example, a game program has been known which allows a user, through his/her instruction, to place an object such as a block in a game space, and allows a player to play a game on the game space in which the object is placed.

When an object having an acute angle part is placed in a virtual space, the acute angle part may hinder a process of detecting a collision between this object and another object, or may complicate the process of collision detection.

Therefore, the present application discloses a storage medium having stored therein an information processing program, an information processing apparatus, an information processing system, and an information processing method, which allow the process of collision detection to be easily performed.

(1) An example of a non-transitory computer readable storage medium described in this specification has stores therein an information processing program to be executed by a computer processor, of an information processing apparatus, for placing a component object to be used for collision detection in a virtual space, based on an instruction of a user. The information processing program causes the computer processor to function as object placement means and image generation means. The object placement means places a slope object having a unit portion, as the component object in the virtual space, based on the instruction of the user. The image generation means generates an image representing the virtual space in which the component object is placed. The object placement means places a first slope object having one unit portion, as the slope object in the virtual space, based on a first instruction of the user. The unit portion has a first portion and a second portion. The first portion has a first side and a second side that form an interior angle being an acute angle. The second portion has a continuous side that is continuous to a vertex of the angle formed by the first side and the second side, and has a side including at least a part of the second side. An interior angle formed by the continuous side and the first side is 90° or more. The object placement means places a second slope object as the slope object in the virtual space, based on a second instruction of the user. The second slope object has a continuous unit portion in which a plurality of the unit portions are connected such that a plurality of the first sides thereof are connected to form a single side.

According to the configuration of the above (1), since the unit portion has the second portion in addition to the first portion having an acute angle part. The second portion allows the acute angle part of the first portion to have an angle of 90° or more. Thus, the number of acute angles in the slope object can be reduced, or the position of an acute angle in the slope object can be changed. Therefore, the likelihood of occurrence of a problem caused by presence of an acute angle in the virtual space can be reduced, whereby the information processing apparatus can easily perform the process of collision detection.

(2) The first portion of the unit portion may have a third side, and an interior angle formed by the first side and the third side may be an acute angle. The slope object further includes a first continuous portion. The first continuous portion has a continuous side that is continuous to an end of a side including the first side of the slope object, and that is continuous to the third side of the unit portion. The first continuous portion has a side including at least a part of the third side. An interior angle formed by the continuous side and the side including the first side is 90° or more.

According to the configuration of the above (2), the acute angle formed by the first side and the third side of the slope object can be eliminated. By placing such a slope object, the likelihood of generation of an acute angle in the virtual space can be reduced.

(3) The continuous side that is continuous to the first side and to the third side may be perpendicular to the gravity direction of the virtual space.

According to the configuration of the above (3), a slope object, in which a side perpendicular to the gravity direction (in other words, a side in the horizontal direction in the virtual space) is continuous to the first side that is oblique to the gravity direction, can be placed. Since such a slope object is easy to use for the user, convenience of the user can be improved.

(4) The slope object may further include a second continuous portion having a continuous side that is continuous to an end of a side including the first side of the slope object, is continuous to the second side of the unit portion, and is perpendicular to the gravity direction of the virtual space.

According to the configuration of the above (4), as in the configuration of the above (3), a slope object, in which a side in the horizontal direction in the virtual space is continuous to the first side that is oblique to the gravity direction, can be placed. Thus, convenience of the user can be improved.

(5) The information processing program may cause the computer processor to function as deletion means. In a case where the slope object is placed in the virtual space such that an end of a side including the first side of the slope object is continuous to a side of another component object, if a part of the slope object overlaps a part of the another component object, the deletion means executes a deletion process of deleting the part of the slope object or the part of the another component object.

According to the configuration of the above (5), the deletion process allows the other component object to be placed such that the oblique side of the slope object is continuous to the other component object. Thus, it is possible to increase the degree of freedom in the shapes that can be generated by component objects.

(6) The deletion means, in the deletion process, may delete the first continuous portion or the second continuous portion, of the slope object, which overlaps the another component object.

According to the configuration of the above (6), by deleting the continuous portion, the shape of the slope object can be altered such that the oblique side of the slope object can be continuous to another component object.

(7) The information processing program may cause the computer processor to function as restoration means. In a case where the component object, which has been partially deleted through the deletion process, is moved based on an instruction of the user and consequently the overlapping with the another component object is eliminated, the restoration means restores the component object, which has been partially deleted, to the state before deletion in the deletion process.

According to the configuration of the above (7), when overlapping of the slope object is eliminated after the deletion process has been executed, the component object, which has been partially deleted, can be restored to the original shape.

(8) The object placement means may change the number of the unit portions included in the slope object placed in the virtual space, based on an instruction of the user.

According to the configuration of the above (8), the object placement means can easily change the length of the oblique side of the slope object.

(9) The unit portion may be a parallelogram having the first side and the second side.

According to the configuration of the above (9), since the unit portion and the continuous unit portion each are a parallelogram, the object placement means can place a slope object having two oblique sides.

(10) The object placement means may place the component object such that vertices of the component object are positioned at intersections of a grid set in the virtual space.

According to the configuration of the above (10), since the component object is placed along the grid, the user can easily place objects, thereby improving convenience in placing component objects.

(11) The information processing program may cause the computer processor to function as complementing means. When a predetermined type of component object is placed in the virtual space, the complementing means determines whether or not a slope object is placed in a part of a determination target cell that is located within a predetermined distance from a cell of the grid where the predetermined type of component object is placed. When a slope object is placed in a part of the determination target cell, the complementing means places a complementary object as a component object so as to fill the entirety of the determination target cell.

According to the configuration of the above (11), a complementary object is placed near a slope object, according to need. Thus, it is possible to reduce the likelihood of generation of a region, from which a player object having entered the region cannot easily escape (a small cell region in an exemplary embodiment described below), near the slope object.

(12) The grid may be composed of a plurality of square cells. The object placement means may invert or rotate the component object within the virtual space, based on an instruction of the user.

According to the configuration of the above (12), the degree of freedom in placing slope objects can be increased.

(13) The object placement means may place the slope object such that the first side of the unit portion is placed along a diagonal line of a quadrangle composed of one or more cells of the grid, and the second side is placed along a side of the cell.

(14) A positive integer, which divides both the number of cells in the vertical direction in the quadrangle whose diagonal line corresponds to the first side of the unit portion and the number of cells in the horizontal direction in the quadrangle, may be only 1.

According to the configuration of the above (14), in the case where the component object is placed in units of cells of the grid, the object placement means can change the length of the oblique side of the slope object in the minimum units. Thus, the degree of freedom in placing slope objects can be increased, and the game space can be effectively utilized.

(15) The information processing program may cause the computer processor to function as player object control means. The player object control means causes a player object placed in the virtual space to move in the virtual space in which the component object is placed, based on an instruction of a player.

According to the configuration of the above (15), in the process of causing the player object to move in the virtual space in which the component object is placed, based on the instruction of the user, it is possible to easily perform a process of detecting a collision between the player object and the component object.

(16) The object placement means may place, as the component object, a two-dimensional object or a three-dimensional object in the virtual space.

This specification discloses examples of an information processing apparatus and an information processing system including the respective means described in the above (1) to (16). In addition, this specification discloses an example of an information processing method to be executed in the information processing apparatus (or the information processing system) in the above (1) to (16).

According to the storage medium having stored therein the information processing program, the information processing apparatus, the information processing system, and the information processing method, the process of collision detection can be easily performed.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
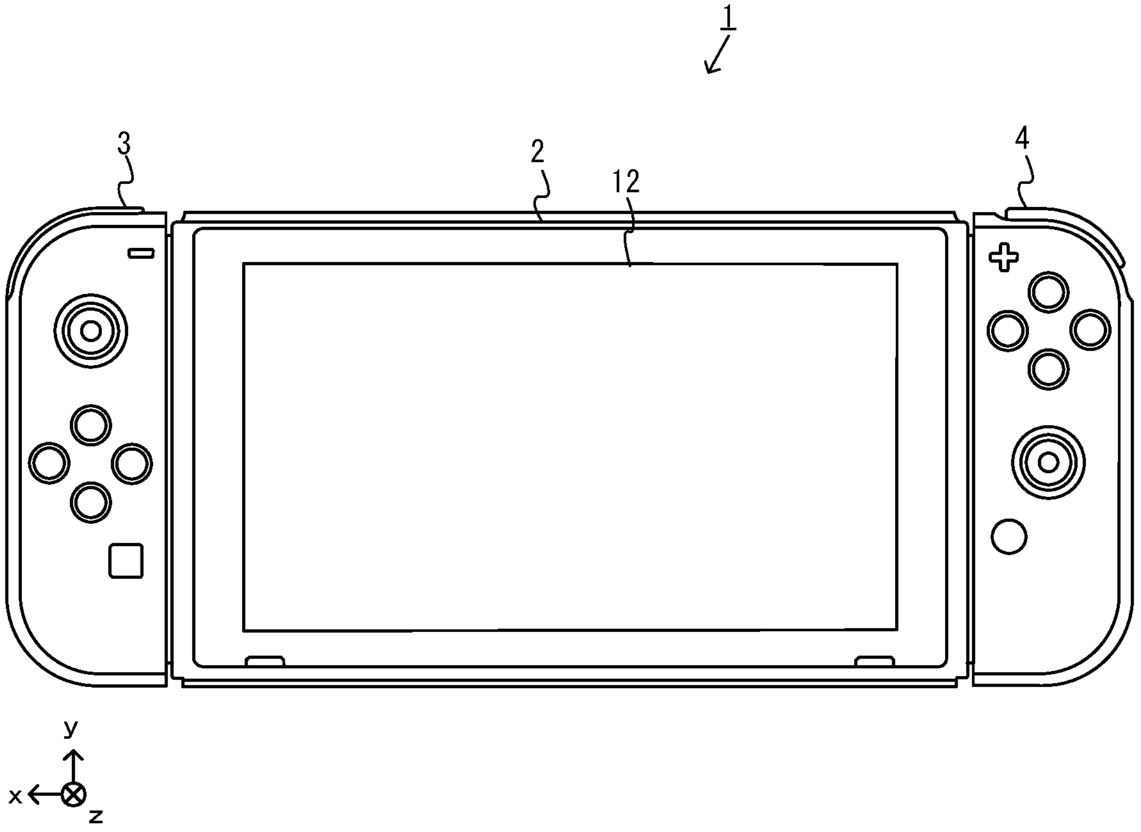
FIG. 1 is a diagram showing an example of a state where a non-limiting left controller and a non-limiting right controller are attached to a non-limiting main body apparatus.

FIG. 1 is a diagram showing an example of a state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
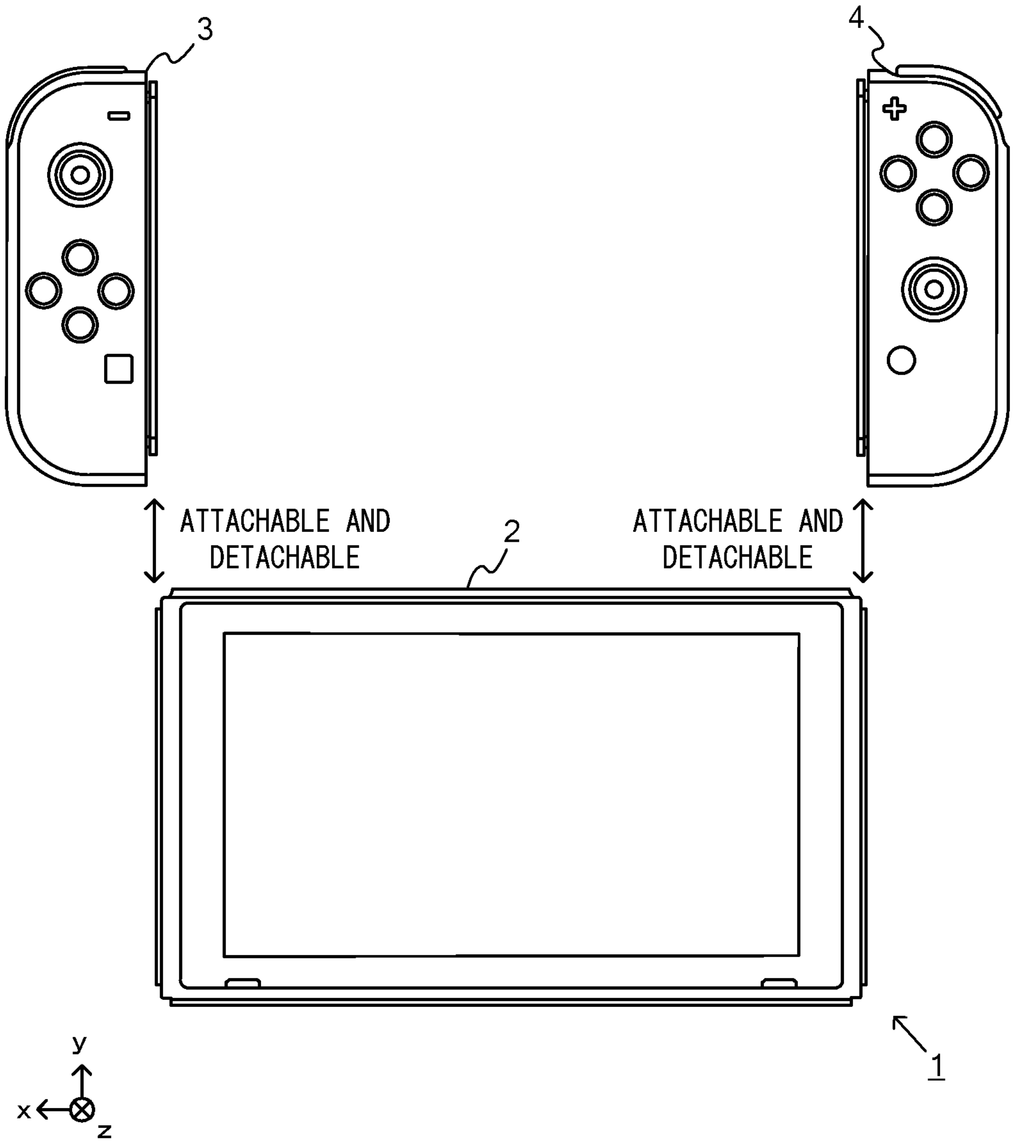
FIG. 2 is a diagram showing an example of a state where each of the non-limiting left controller and the non-limiting right controller is detached from the non-limiting main body apparatus.

FIG. 2 is a diagram showing an example of a state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
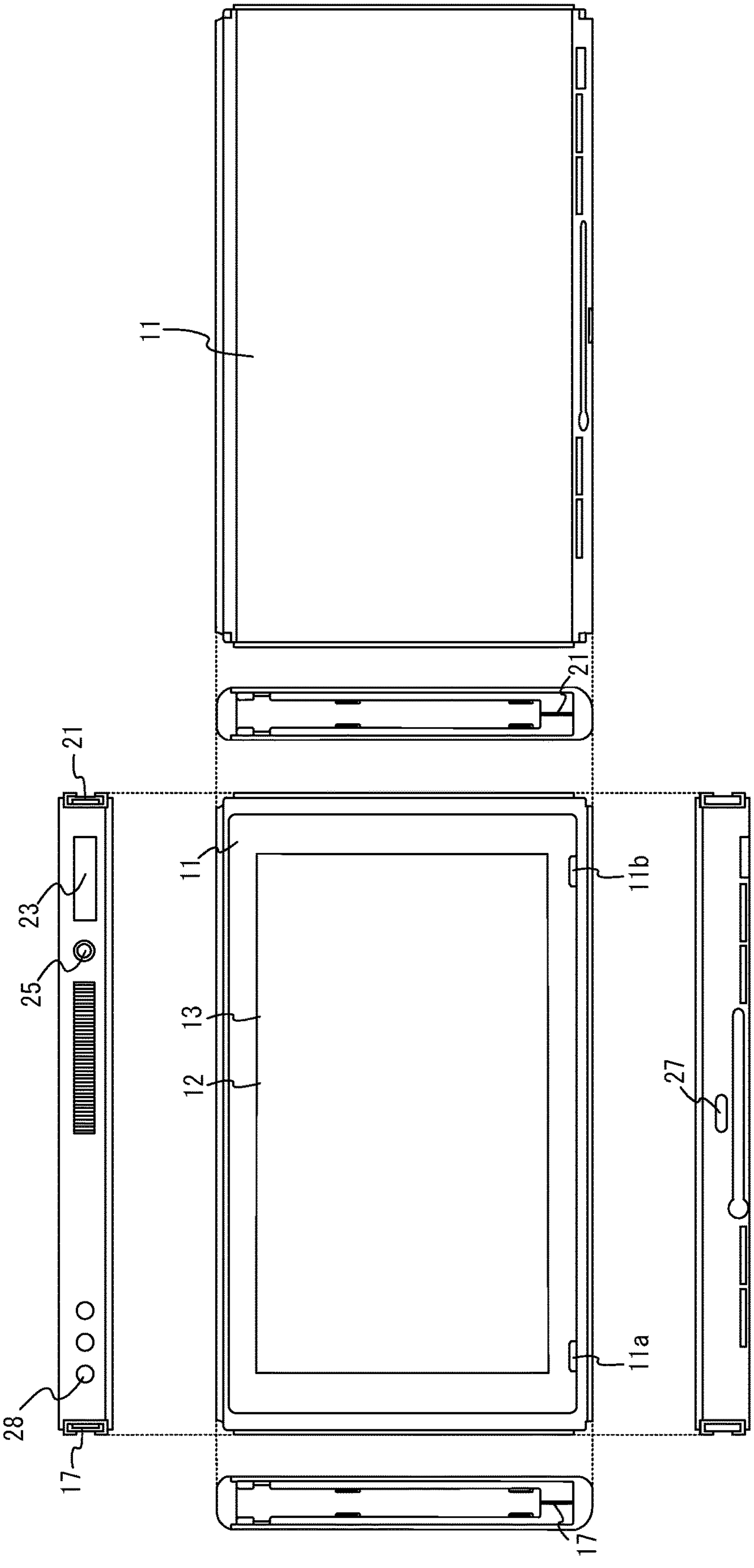
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
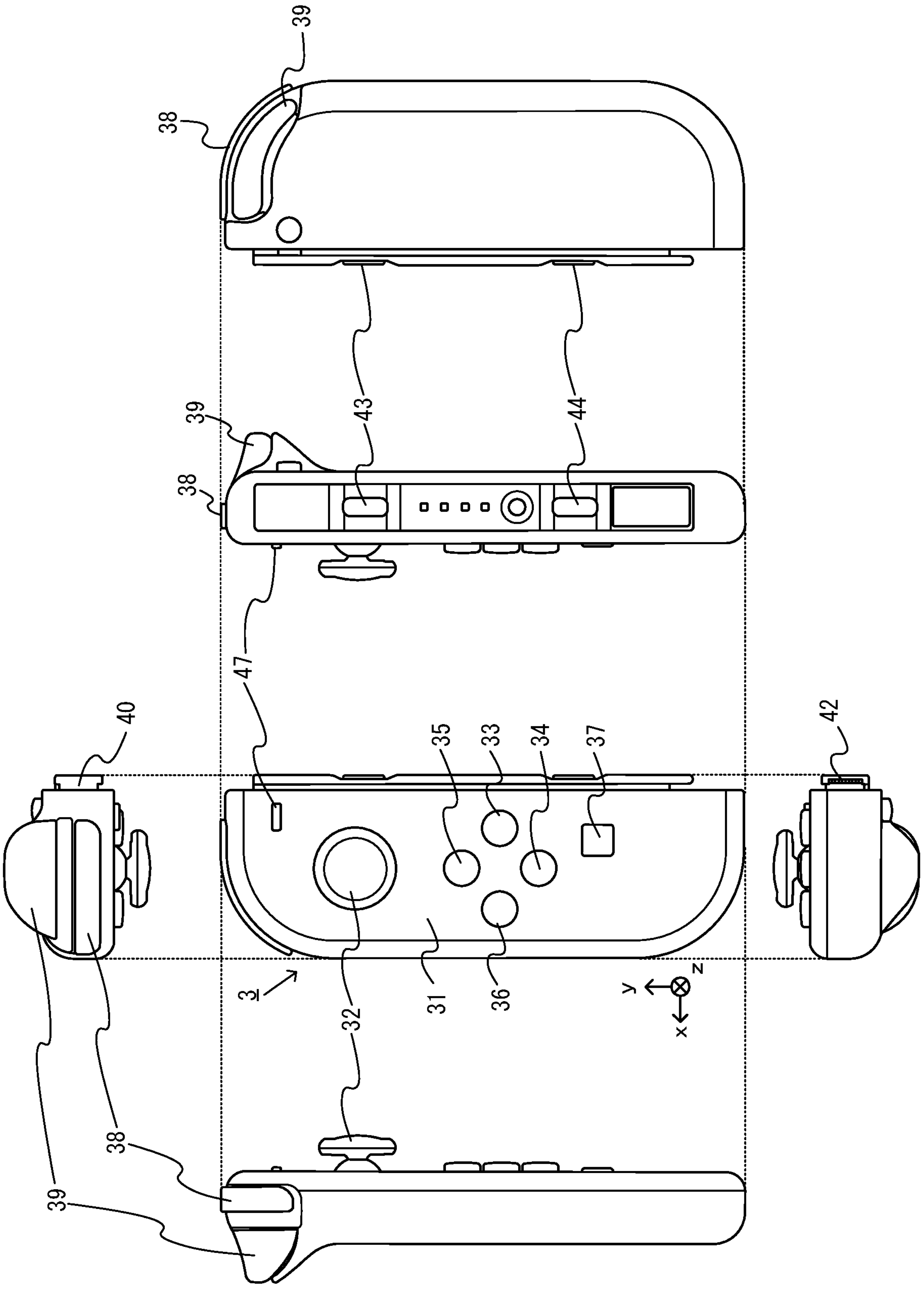
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "–" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
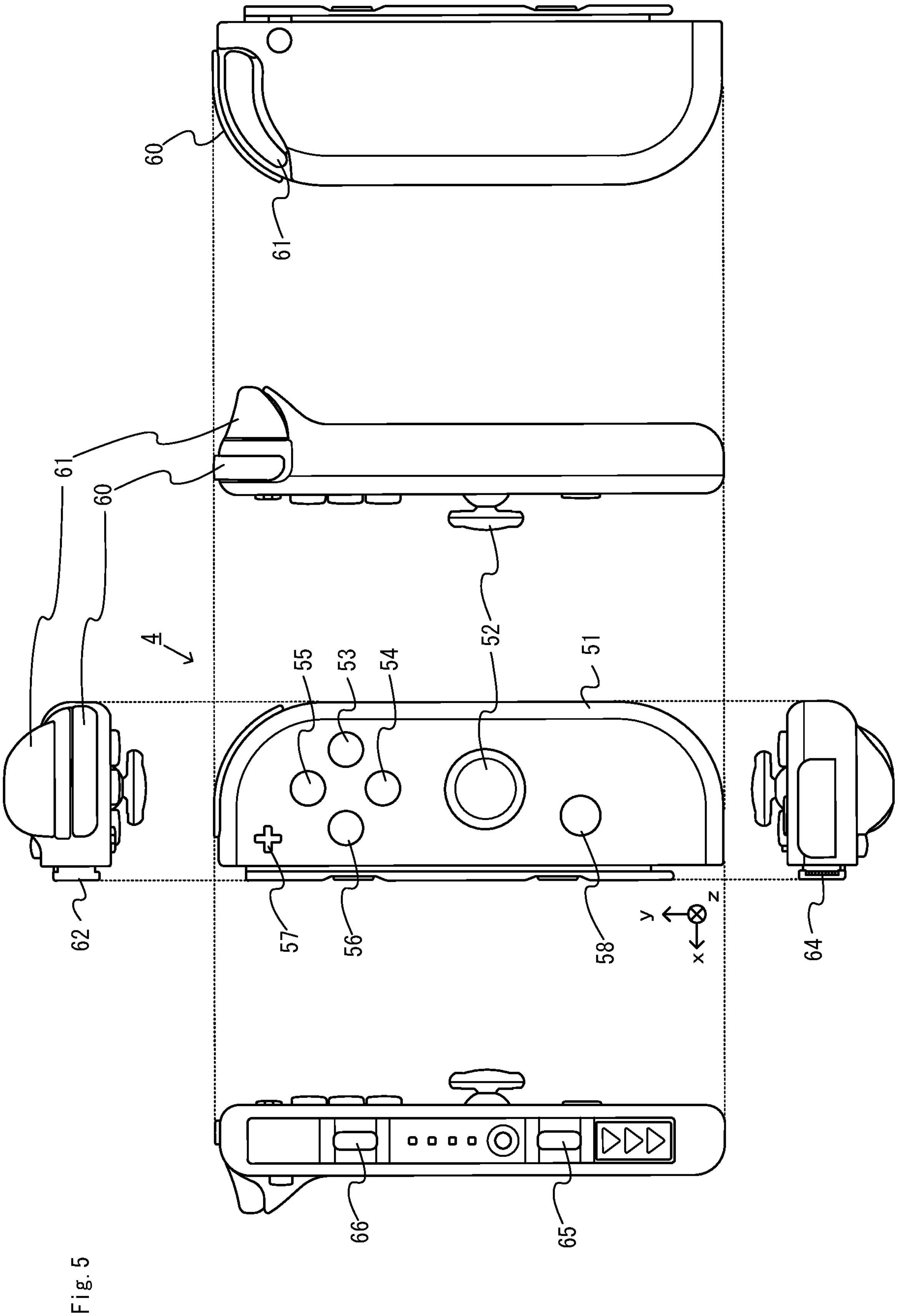
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
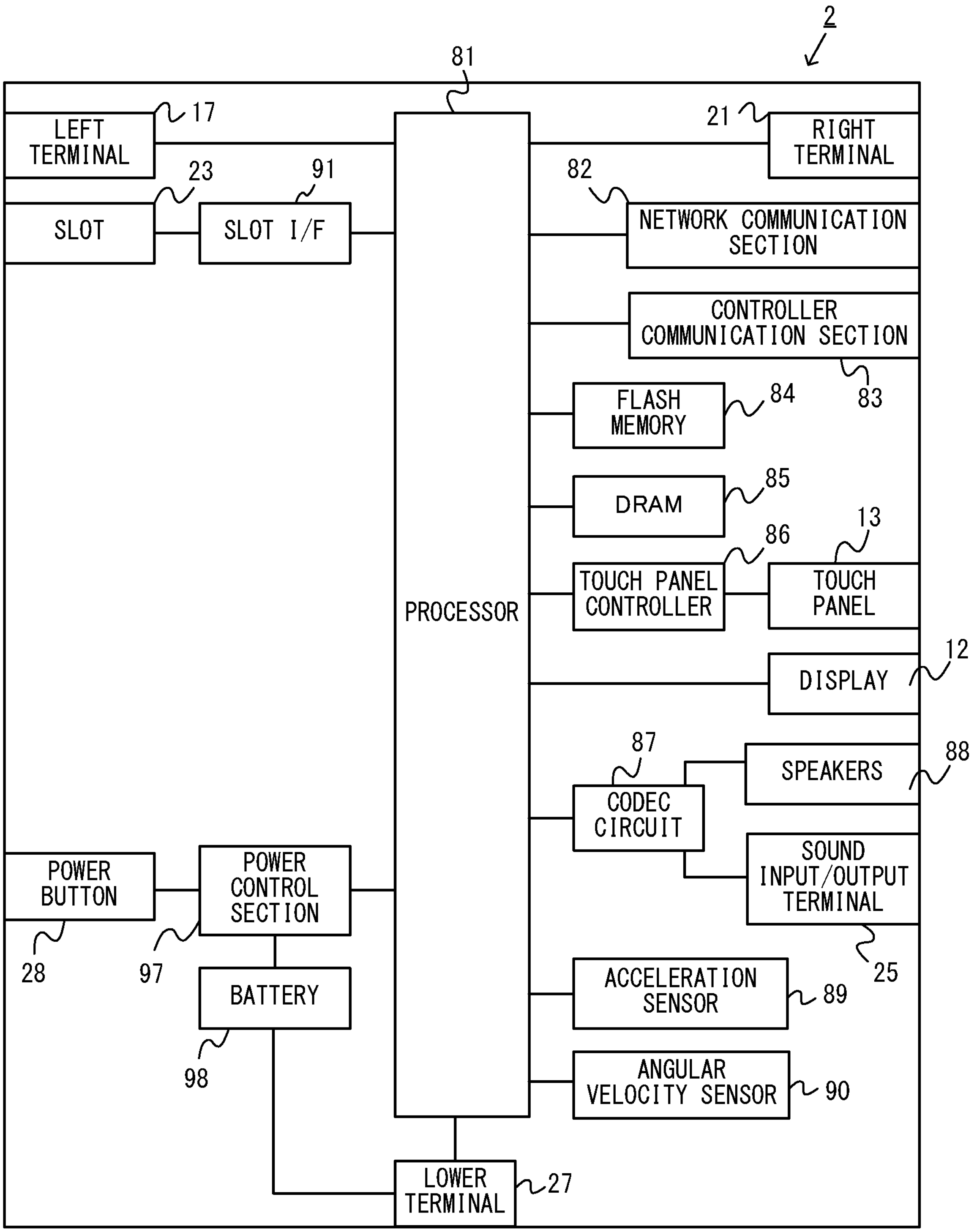
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
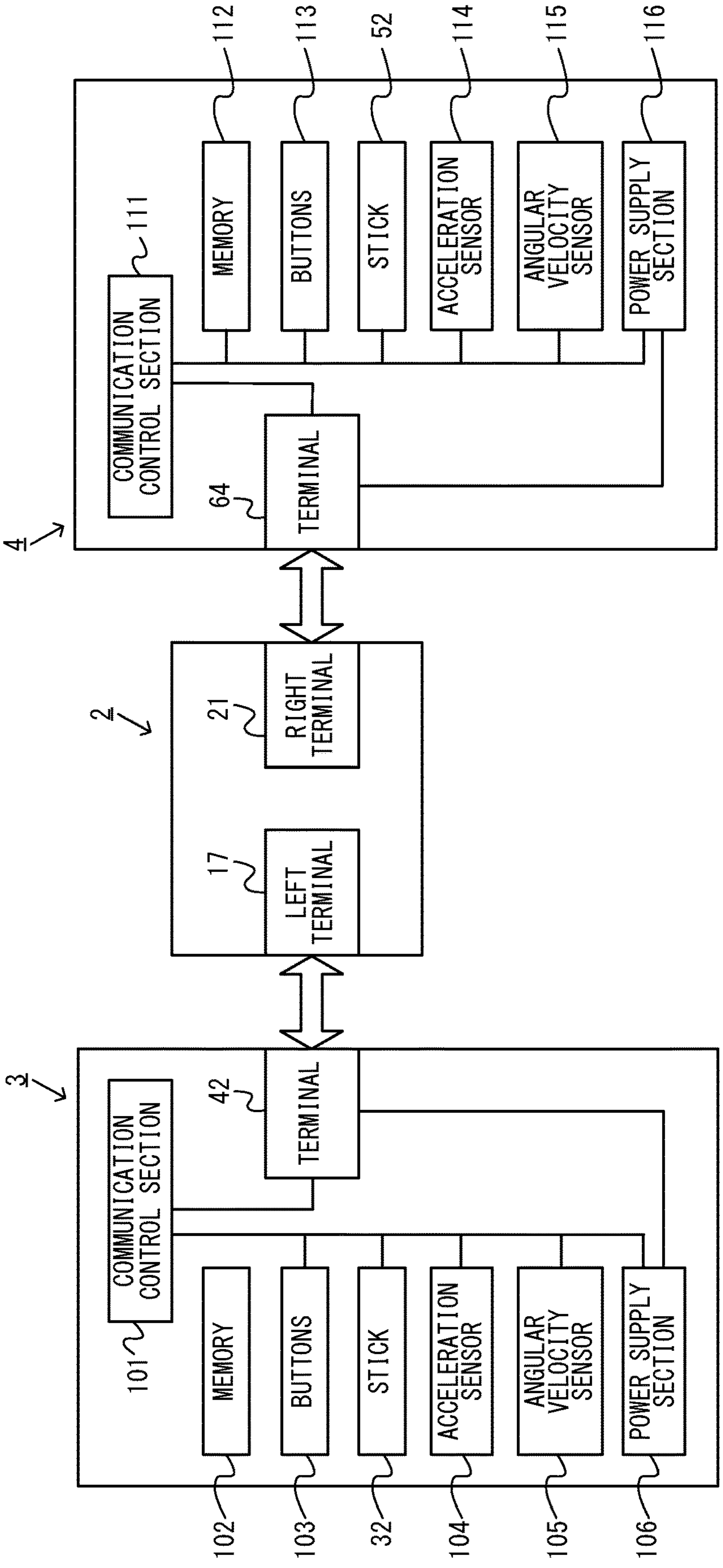
FIG. 7 is a block diagram showing examples of the internal configurations of the non-limiting main body apparatus, the non-limiting left controller, and the non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 106. In the exemplary embodiment, the power supply section 106 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 116. The power supply section 116 has a function similar to that of the power supply section 106 of the left controller 3 and operates similarly to the power supply section 106.

2. Outline of Processing in Game System

[2-1. Outline of Game and Game Processing]

Hereinafter, an outline of information processing to be executed by the game system 1 according to the exemplary embodiment will be described with reference to FIG. 8. In the exemplary embodiment, the game system 1 executes a game program for a game in which a user creates a game space (in other words, a game stage), and plays by using the created game space. That is, this game has: a creation mode in which the user creates a game space; and a play mode in which the user (in other words, a player) plays by using the game space. In the creation mode, the user creates a game space by placing objects in the game space. In the play mode, the player controls a player object, which appears in the game space, to achieve a purpose (e.g., to reach a goal)

in the game. In the exemplary embodiment, a person who creates a game space in the creation mode is called a "user", and a person who plays the game in the play mode is called a "player". The user and the player may be the same person or different persons.

Figure 8:
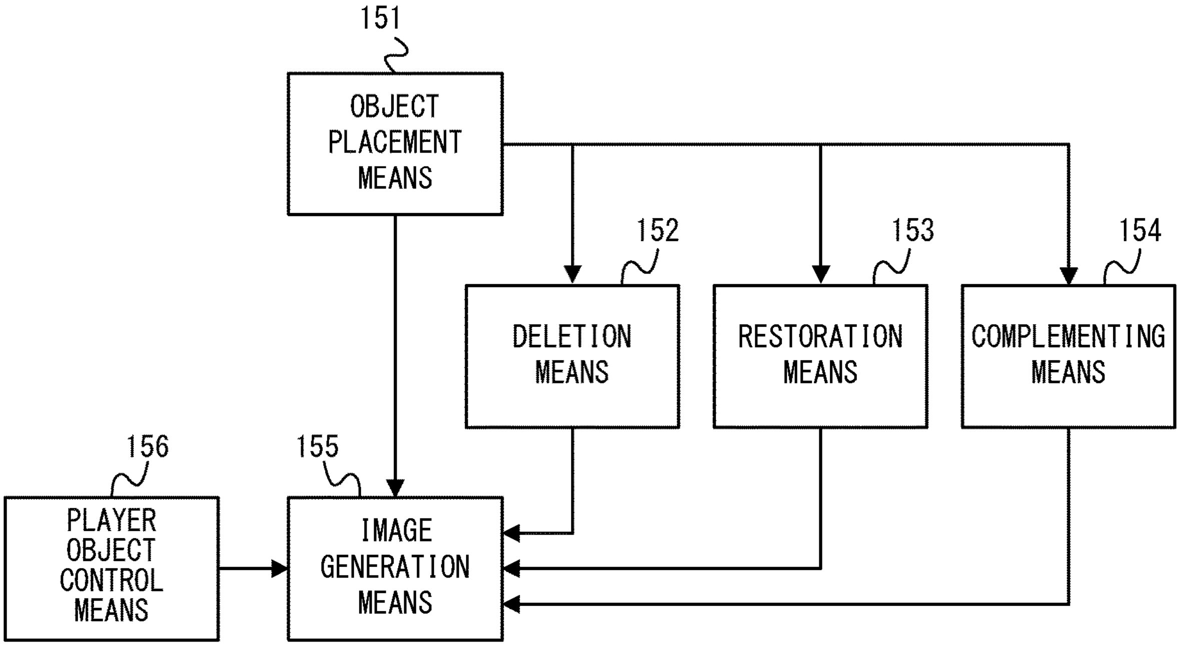
FIG. 8 is a functional block diagram showing an example of a functional configuration of a non-limiting game system.

FIG. 8 is a functional block diagram showing an example of a functional configuration of the game system 1. In the exemplary embodiment, the game system 1 includes object placement means 151, deletion means 152, restoration means 153, complementing means 154, image generation means 155, and player object control means 156. In the exemplary embodiment, the respective means 151 to 156 are implemented by a processor 81 of the main body apparatus 2. Specifically, the means 151 to 156 are implemented when the processor 81 executes an information processing program (specifically, a game program) stored in a storage medium that is accessible to the processor 81. The "storage medium that is accessible to the processor 81" may be, for example, the flash memory 84, or a storage medium attached to the slot 23.

In the creation mode, the object placement means 151 places a component object in the game space, based on an instruction of the user. Examples of the component object include: terrain objects (e.g., a block object, a slope object, and a complementary object described below) constituting the game space; and obstacle objects (e.g., a pipe object described below). In the exemplary embodiment, a component object is used for collision detection (also referred to as hitting determination). That is, the game system 1 performs detection of a collision between a component object and a player object during the game play in the play mode. The object placement means 151 moves the component object placed in the game space or alters the shape of the component object, based on an instruction of the user.

The object placement means 151 receives input information indicating an instruction of the user, places a component object in the game space, and outputs component object information. For example, the component object information is information for defining the component object placed in the game space, and specifically indicates the type, position, shape, and direction of the component object.

In the creation mode, the deletion means 152 executes, under a predetermined condition, a deletion process of deleting a part of the component object placed in the game space. The deletion process will be described in detail in "[2-5. Deletion process for slope object]" described below. The deletion means 152 executes the deletion process on the component object according to need, based on the component object information output from the object placement means 151, and outputs component object information indicating the component object after the deletion process.

In the creation mode, as for the component object which has been partially deleted through the deletion process, the restoration means 153 executes, under a predetermined condition, a restoration process of restoring the deleted part. The restoration process will be described in detail in "[2-5. Deletion process for slope object] described below. The restoration means 153 executes the restoration process on the component object according to need, based on the component object information output from the object placement means 151, and outputs component object information indicating the component object after the restoration process.

In the creation mode, when a component object is placed in the game space, the complementing means 154 executes a complementation process of placing a complementary object in the game space in response to that a complementation condition described below is satisfied. The complementary object and the complementation process will be described in detail in "[2-6. Complementation process regarding slope object]" described below. The complementing means 154 executes the complementation process according to need, based on the component object information output from the object placement means 151, and outputs component object information regarding the complementary object placed in the game space through the complementation process.

The image generation means 155 generates a game image representing the game space created based on the information output from the respective means 151 to 154. The game image created by the image generation means 155 is output to and displayed on a display device. In the creation mode, the game image (see FIG. 9) representing the game space being created is displayed on the display device. The display device on which the game image is displayed may be the display 12 of the main body apparatus 2, or the stationary monitor connected to the cradle.

In the play mode, the player object control means 156 causes a player object placed in the game space, in which the component object is placed, to move based on an instruction of the player. The player object control means 156 receives input information indicating the instruction of the player, causes the player object to move based on the instruction, and outputs player object information regarding the moved player object. For example, the player object information is information for defining the player object placed in the game space, and specifically indicates the state, size, position, and posture of the player object. The player object control means 156 may control the motion of another object that appears in the game space, in addition to the player object. Examples of the other object include an enemy object, an item object, and a terrain object (that is, the terrain object may be movable).

In the play mode, based on the player object information, the image generation means 155 generates an image representing the game space including the player object. In the play mode, the game image, which represents the game space including the player object being operated by the player, is displayed on the display device.

[2-2. Objects Placed in Game Space]

Figure 9:
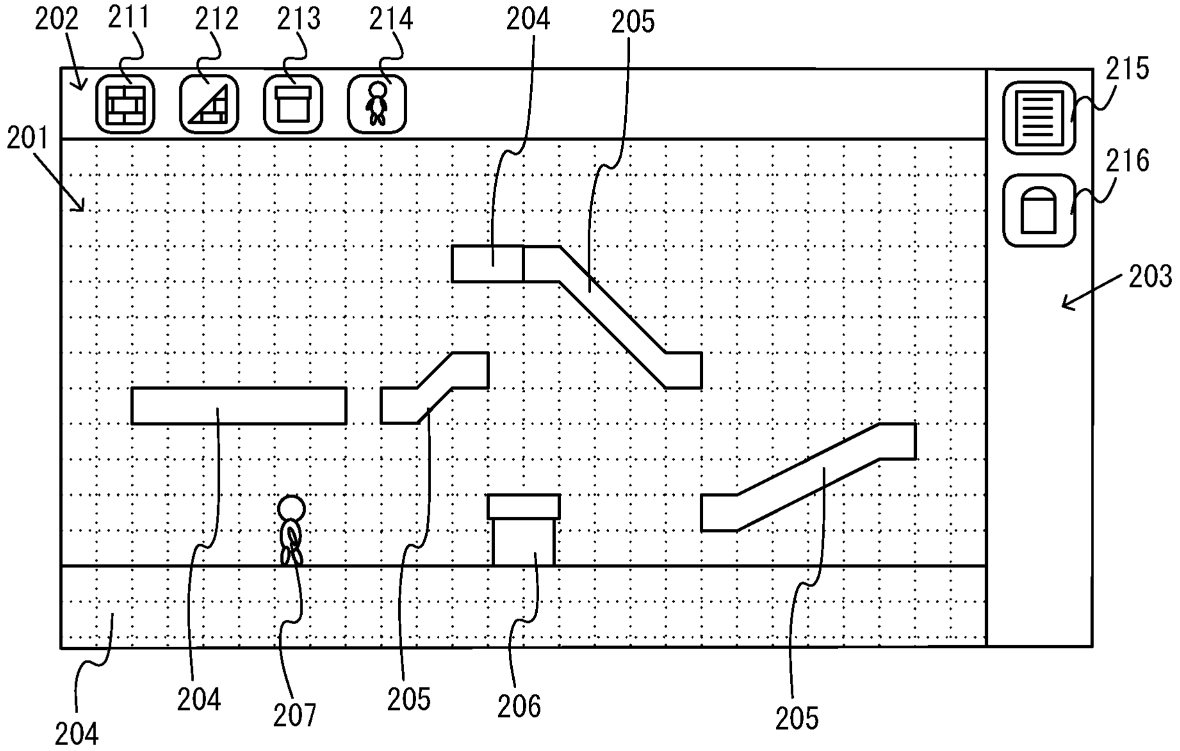
FIG. 9 shows an example of a game image displayed in a creation mode.

Next, various objects placed in a game space will be described with reference to FIG. 9 shows an example of a game image displayed in the creation mode. As shown in FIG. 9, the game image in the creation mode includes a game space image 201 representing a game space.

In the exemplary embodiment, a block object 204, a slope object 205, and a pipe object 206 can be disposed as component objects in the game space. Each of the block object 204 and the slope object 205 is an object representing a terrain in the game space. The block object 204 is an object composed of only a side directed in the vertical direction and a side directed in the horizontal direction in the game space. In the exemplary embodiment, the slope object 205 is an object having an oblique side inclined with respect to the vertical direction or the horizontal direction in the game space. The slope object 205 can be regarded as an object representing a hill in the game space. The pipe object 206 is an object representing an obstacle in the game space.

As shown in FIG. 9, a player object 207 is placed in the game space. In the play mode, the game is started with the player object 207 being placed in a position where the player object 207 has been placed in the creation mode. In the exemplary embodiment, in addition to the player object 207, an enemy object and an item object can be placed in the game space, based on an instruction of the player.

As shown in FIG. 9, the game image in the creation mode includes an object bar image 202 used for designating an object to be placed in the game space. The object bar image 202 includes icons 211 to 214 each allowing a placement instruction to place an object that can be placed in the game space. Specifically, a block icon 211 is an icon that allows a placement instruction to place a block object 204. A slope icon 212 is an icon that allows a placement instruction to place a slope object 205. A pipe icon 213 is an icon that allows a placement instruction to place a pipe object 206. A player icon 214 is an icon that allows a placement instruction to place a player object 207.

In the exemplary embodiment, in the creation mode, the user performs an instruction to select one of the icons 211 to 214 (e.g., an instruction made by touching the icon), and thereafter performs a placement instruction to designate a position in the game space on the screen (e.g., an instruction made by touching the position), whereby the user can place an object corresponding to the selected icon in the game space. The operation to instruct placement of an object in the game space is optional, and an object may be placed through other operations.

As shown in FIG. 9, the game image in the creation mode includes a menu bar image 203 used for performing various instructions in the creation mode. In the exemplary embodiment, the menu bar image 203 includes a menu icon 215 and a deletion icon 216. The menu icon 215 is an icon that allows an instruction to display a menu image. The menu image includes icons that allow, for example, an instruction to store a created game space, an instruction to end the creation mode, an instruction to shift to the play mode, and an instruction to end the game. That is, the user is allowed to perform these instructions by causing the menu image to be displayed. The deletion icon 216 is an icon that allows an instruction to delete an object placed in the game space. For example, in the creation mode, the user performs an instruction to select the deletion icon 216 and thereafter performs an instruction to designate an object placed in the game space, whereby the user is allowed to delete the designated object from the game space.

In the exemplary embodiment, as shown in FIG. 9, a grid is set in the game space during the creation mode. In the exemplary embodiment, the grid is defined by vertical grid lines and horizontal grid lines (see dotted lines shown in FIG. 9). In the exemplary embodiment, the vertical direction in the game space is parallel to the gravity direction (specifically, the vertically-downward direction) virtually set in the game space. The horizontal direction in the game space is a direction perpendicular to the gravity direction. As shown in FIG. 9, each of cells forming the grid is square in shape.

In the exemplary embodiment, in the creation mode, each object is placed along the cells of the grid. That is, the object placement means 151 places a component object such that the vertices of the component object are positioned at the intersections of the grid. For example, a block object and a slope object are placed such that the vertices of each object match the intersections of the grid (in other words, the vertices of the cells). An object is not necessarily located such that the vertices of the object match the intersections of the grid. For example, when a corner of an object is rounded, the corner of the placed object need not match an intersection of the grid lines. In this case, for example, the object may be placed such that a part of a side of the object is positioned on a grid line. The grid set in the game space enables the user to easily place the objects. In another embodiment, such a grid need not be set in a game space in which component objects are placed.

[2-3. Slope Object]

Figure 10:
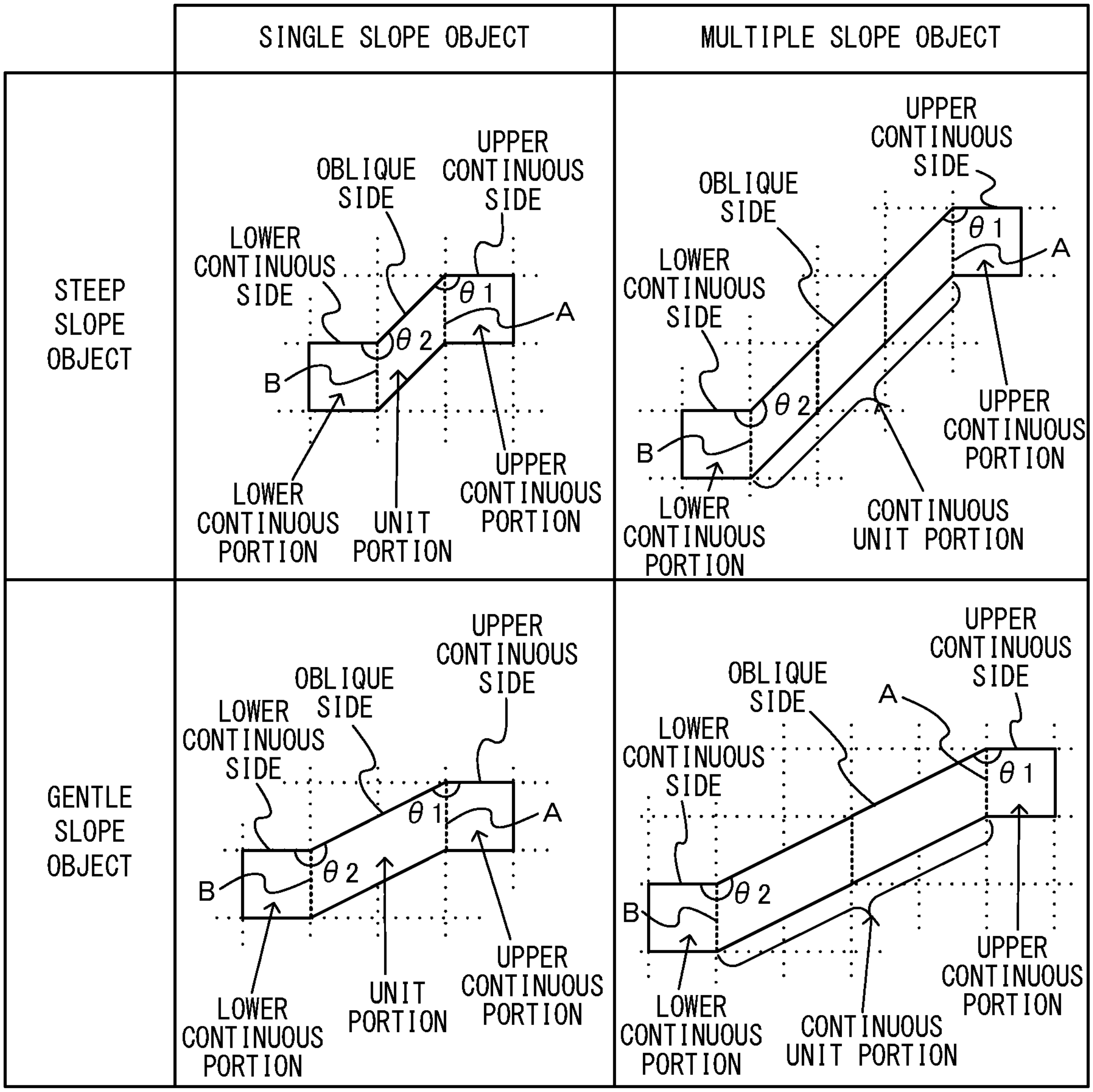
FIG. 10 shows examples of non-limiting slope objects.

Next, a slope object will be described with reference to FIG. 9 and FIG. 10. In the exemplary embodiment, the object placement means 151 places a slope object in the game space, based on a placement instruction of the user. FIG. 10 shows examples of types of slope objects. As shown in FIG. 10, in the exemplary embodiment, two types of slope objects, i.e., a steep slope object and a gentle slope object, are prepared in the game system 1. A steep slope object is a slope object having a relatively steep inclination of an oblique side. In the exemplary embodiment, the oblique side of the steep slope object has an inclination such that the vertical-to-horizontal ratio is 1:1 (see FIG. 10). A gentle slope object is a slope object having a relatively gentle inclination of an oblique side. In the exemplary embodiment, the oblique side of the gentle slope object has an inclination such that the vertical-to-horizontal ratio is 1:2 (see FIG. 10).

In the exemplary embodiment, the user can change the slope icon 212 represented as a game image by performing a switching instruction. That is, according to the switching instruction of the user, the game system 1 switches the slope icon 212 between an icon representing a steep slope object and an icon representing the gentle slope object. The user causes the icon representing his/her desired slope object, which is either the steep slope object or the gentle slope object, to be displayed as the slope icon 212, and thereafter makes an instruction to select the slope icon 212, thereby placing the desired slope object in the game space.

As shown in FIG. 10, each slope object includes a unit portion and a continuous portion. The unit portion has an oblique side directed in a direction inclined with respect to a reference direction (i.e., the direction of the grid line). As shown in FIG. 10, the inclination of the oblique side in the unit portion differs between the steep slope object and the gentle slope object. Each slope object shown in FIG. 10 has an oblique side whose right end is on the upper side relative to the left end thereof. However, in the exemplary embodiment, it is also possible to place a slope object having an oblique side whose left end is on the upper side relative to the right end thereof.

In the exemplary embodiment, the unit portion is a parallelogram having oblique sides and sides parallel to the vertical direction in the game space. However, the shape of the unit portion is not limited to a parallelogram, and may be any other shape (see "(Modifications regarding shape of slope object)" described below).

As shown in FIG. 10, in the exemplary embodiment, a slope object having one unit portion and a slope object having a plurality of unit portions can be placed. Here, the slope object having one unit portion is referred to as a "single slope object", and the slope object having a plurality of unit portions is referred to as a "multiple slope object". As shown in FIG. 10, for each of the steep slope object and the gentle slope object, a single slope object and a multiple slope object can be placed.

As shown in FIG. 10, in the multiple slope object, a plurality of unit portions are continuously disposed. Specifically, the plurality of unit portions in the multiple slope object are placed such that the oblique sides of the plurality of unit portions are continuous so as to form a single oblique side. In the following description, a portion, which is composed of a plurality of unit portions included in a multiple slope object, is referred to as a "continuous unit portion".

As shown in FIG. 10, each slope object has continuous portions (specifically, an upper continuous portion and a lower continuous portion). Each continuous portion is a portion having a side continuous to the oblique side. As shown in FIG. 10, in the exemplary embodiment, each slope object includes two continuous portions, i.e., a lower continuous portion and an upper continuous portion. One of the two continuous portions is continuous to one end of a unit portion or a continuous unit portion while the other continuous portion is continuous to the other end of the unit portion or the continuous unit portion. Specifically, the lower continuous portion is a continuous portion having a side (referred to as "lower continuous side") continuous to the lower end of the oblique side. The upper continuous portion is a continuous portion having a side (referred to as "upper continuous side") continuous to the upper end of the oblique side.

As shown in FIG. 10, in the exemplary embodiment, each continuous side is parallel to the horizontal grid line. Therefore, in the exemplary embodiment, each continuous side is set such that an interior angle formed with the oblique side is 90° or more. More specifically, the upper continuous side is set such that an angle θ1 formed with the oblique side is an obtuse angle (i.e., $90° < \theta 1 < 180°$). The lower continuous side is set such that an angle θ2 formed with the oblique side is a reflex angle (i.e., $180° < \theta 2 < 360°$). An interior angle formed by the continuous side and the oblique side may range from 90° to 270°. For example, the lower continuous side may be set such that an interior angle θ2 formed with the oblique side is $180° < \theta 2 < 270°$. In this case, an exterior angle formed by the continuous side and the oblique side can also be prevented from being an acute angle.

Each continuous portion is composed of only sides parallel to the directions of the grid lines (i.e., the vertical direction and the horizontal direction). In the exemplary embodiment, each continuous portion is square in shape, having the same size as the cell of the grid.

As described above, in the exemplary embodiment, a slope object is composed of a unit portion and continuous portions. Therefore, the game system 1 can place a plurality of types of slope objects having different lengths of oblique sides by changing the number of unit portions. For example, FIG. 10 shows a steep slope object having three unit portions. However, the game system 1 can place a steep slope object having two unit portions, or a steep slope object having four or more unit portions.

Figure 24:
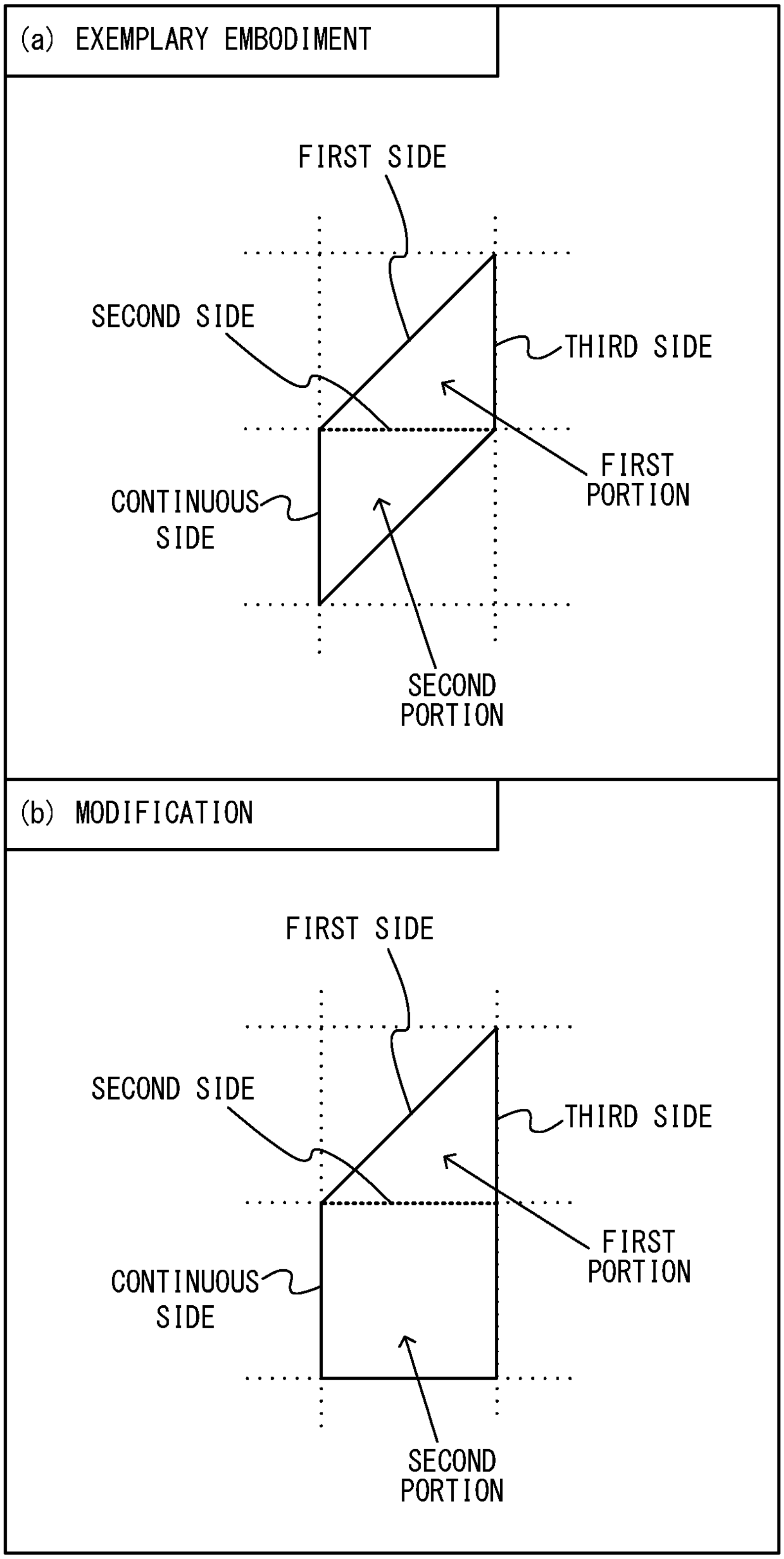
FIG. 24 shows an example of a non-limiting unit portion.

In this specification, for the purpose of describing the configuration of a slope object, the slope object will be described separately for a unit portion and a continuous portion. Furthermore, in "[4. Function and effect of exemplary embodiment, and modifications]" described below, for the purpose of describing the configuration of a unit portion, the unit portion will be described separately for a first part and a second part (FIG. 24). However, the game system 1 does not have to manage the slope object separately for the respective portions described above. That is, the game system 1 may manage the slope object as one component object, or may manage the respective portions constituting the slope object, as different component objects.

The game system 1 may prepare, in advance, a plurality of types of slope objects having different numbers of unit portions. Alternatively, the game system 1 may prepare unit portions and continuous portions in advance, and may combine the unit portions and the continuous portions to create a plurality of types slope objects having different lengths of oblique sides.

As described above, in the exemplary embodiment, each slope object has continuous sides connected to an oblique side, and therefore has a shape having no acute angle (see FIG. 10). If an acute angle part is generated in the terrain in the game space as a result of placement of an object having an acute angle in the game space, the process of detecting a collision between the object and the terrain may not be appropriately performed, or may be complicated. This situation may result in an increase in the processing load in the game system 1 and/or an increase in the work load on a developer.

Figure 11:
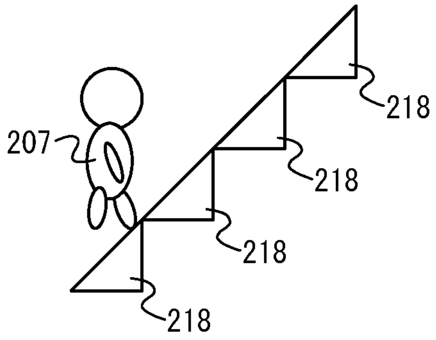
FIG. 11 shows an example of a terrain having acute angle parts in a game space.

FIG. 11 shows an example of a terrain having acute angle parts in the game space. For example, as shown in FIG. 11, the case where a terrain in which right triangle objects 218 each having acute angle parts are continued, is considered. In a game that allows the user to create a game space as in the exemplary embodiment, such a terrain may be creased by the user while the developer has not created such a terrain.

In FIG. 11, four right triangle objects 218 are placed such that the oblique sides thereof are continuous. In this case, the objects 218 abut each other at the vertices of the acute angles, that is, the objects 218 abut each other only at points. Therefore, at the position of a point where two objects 218 abut each other, the player object 207 is likely to slip through the slope, or is likely to be caught and hindered from smoothly moving. Further, in FIG. 11, each of the both ends of the slope formed by the four objects 218 has an acute angle. In the vicinity of the acute angle part, the behavior of the player object 207 is likely to be unnatural. For example, the player object 207 is likely to move through the acute angle part at the end of the slope, or is likely to be caught by the acute angle part and hindered from smoothly moving. In order to reduce the likelihood, it is considered to make the collision detection process complicated (e.g., a special collision detection process is executed for the aforementioned terrain). However, the complicated collision detection process may result in an increase in the processing load in the game system 1 and/or an increase in the work load on the developer.

Meanwhile, in the exemplary embodiment, since the object placement means 151 places the slope object having no acute angle in the game space, the likelihood of generating an acute angle part in the terrain in the game space can be reduced. Thus, the collision detection process can be simplified, and the game system 1 can easily perform the collision detection process. Consequently, the processing load in the game system 1 can be reduced, and/or the work load on the developer can be reduced.

In the exemplary embodiment, the unit portion has an oblique side and a side A adjacent to the oblique side (see FIG. 10; in other words, a third side in FIG. 24), and an angle formed by the oblique side and the side A is an acute angle. In the exemplary embodiment, the slope object has a continuous portion (i.e., an upper continuous portion). The continuous portion has a continuous side that is continuous to an end of the oblique side and continuous to the side A of the unit portion (in other words, a continuous side that is continuous to an end, of the both ends of the oblique side, continuous to the side A of the unit portion, i.e., an upper continuous side), and has the side A as one side. An interior angle formed by the oblique side and the continuous side is 90° or more. Thus, the acute angle formed by the oblique side and the side A in the slope object is eliminated, whereby the likelihood of generation of an acute angle part in the terrain in the game space can be reduced.

In the exemplary embodiment, the continuous side (i.e., the upper continuous side) is perpendicular to the gravity direction in the game space (in other words, the continuous side is in the horizontal direction). Therefore, the oblique side of the slope object can be made continuous to a horizontal terrain in the game space, thereby providing a component object that is easy to use for the user.

In the exemplary embodiment, the slope object further has a continuous portion (i.e., a lower continuous portion) having a continuous side (i.e., a lower continuous side). The continuous side is continuous to an end of the oblique side and continuous to the side B (see FIG. 10) of the unit portion (in other words, continuous to a side, of the both sides of the oblique side, continuous to the side B of the unit portion), and is perpendicular to the gravity direction in the game space. Therefore, the oblique side of the slope object can be made continuous to a horizontal terrain in the game space, thereby providing a component object that is easy to use for the user.

In the exemplary embodiment, in the unit portion, an angle formed by the side B and a side opposed to the oblique side is also an acute angle (FIG. 10). In the exemplary embodiment, the slope object has a continuous portion (i.e., a lower continuous portion). The continuous portion has a continuous side (i.e., a lower continuous side) that is continuous to a side, of the both sides of the oblique side, continuous to the side B of the unit portion, and has the side B as one side. An interior angle formed by the continuous side and the side opposed to the oblique side is 90° or more. Thus, the acute angle formed by the side B and the oblique side in the slope object is eliminated, whereby the likelihood of generation of an acute angle part in the terrain in the game space can be reduced.

[2-4. Process of Altering Shape of Slope Object]

Next, a process of altering the shape of a slope object will be described with reference to FIG. 12 and FIG. 13. In the exemplary embodiment, in the creation mode, the user is allowed to alter the shape a slope object placed in a game space. Specifically, based on an instruction of the user, the game system 1 extends/contracts an oblique side of the slope object, and/or changes the direction of the oblique side. Hereinafter, the process of altering the shape of a slope object will be described.

Figure 12:
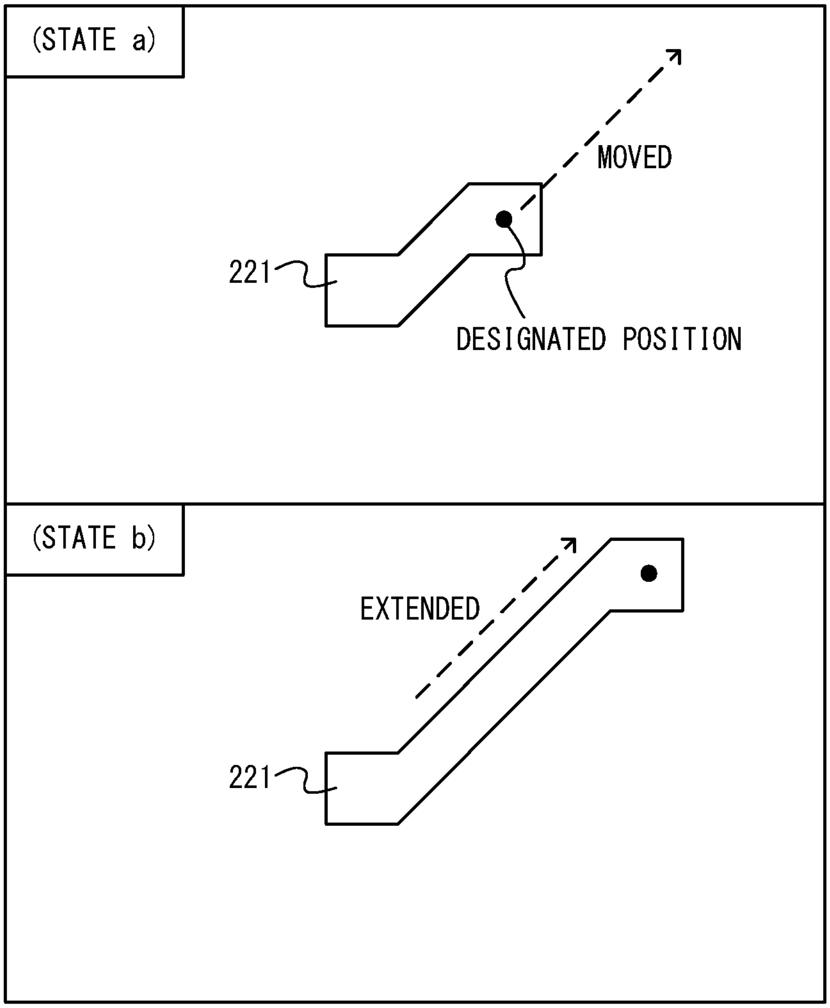
FIG. 12 shows an example of a process of extending a non-limiting slope object.

FIG. 12 shows an example of a process of extending a slope object. In state a shown in FIG. 12, a slope object 221 is placed in the game space. The slope object 221 is a single slope object. Hereinafter, a process of altering the shape of the slope object 221 will be described as an example.

In state a shown in FIG. 12, the user performs a shape-alteration instruction to the slope object. In the exemplary embodiment, the object placement means 151 receives, as the shape-alteration instruction, an instruction made by a drag operation including: designating the position of a continuous portion of the slope object on the screen; and moving the designated position on the screen. The specific content of the operation of the shape-alteration instruction is optional, and the shape-alteration instruction may be performed by any operation other than the drag operation.

In state a shown in FIG. 12, the user performs an operation of designating the upper continuous portion of the slope object 221 and moving the designated position from the position of the upper continuous portion to the upper right, thereby performing the shape-alteration instruction (see FIG. 12). At this time, as in state b shown in FIG. 12, the object placement means 151 alters the shape of the slope object 221 so as to extend the oblique side of the slope object 221. Although not shown in FIG. 12, in state b, when an operation of moving the designated position to the lower left is performed, the object placement means 151 contracts the oblique side of the slope object. Thus, the object placement means 151 extends/contracts the oblique side of the slope object 221 in accordance with the operation of designating the continuous portion of the slope object 221 and moving the designated position.

Specifically, in the exemplary embodiment, the object placement means 151 increases/decreases the number of unit portions included in the slope object to extend/contract the oblique side of the slope object. Specifically, the object placement means 151 prepares unit portions and continuous portions in advance, and changes the number of unit portions in accordance with the shape-alteration instruction, thereby representing the manner of extension/contraction of the slope object. In another embodiment, the object placement means 151 may prepare, in advance, a plurality of types of slope objects having different numbers of unit portions, and may replace the slope object placed in the game space with another slope object in accordance with the shape-alteration instruction, thereby representing the manner of extension/contraction of the slope object.

As described above, in the exemplary embodiment, the object placement means 151 changes the number of the unit portions included in the slope object placed in the game space, based on the shape-alteration instruction of the user. Thus, the game system 1 can easily change the length of the oblique side of the slope object without performing, for example, the process of extending/contracting the object.

In the exemplary embodiment, the object placement means 151 alters the shape of a slope object, based on an instruction to designate a continuous portion of the slope object. Thus, in the exemplary embodiment, since the continuous portion of the slope object serves as a mark for a shape-alteration instruction, the user can easily perform the shape-alteration instruction. Although details will be described below, in the exemplary embodiment, a movement instruction for a slope object includes an instruction to designate the unit portion of the slope object. That is, in the exemplary embodiment, since the game system 1 discriminates between a shape-alteration instruction and a movement instruction depending on which of a continuous portion and a unit portion has been designated, these two instructions can be made easy to understand for the user.

Figure 13:
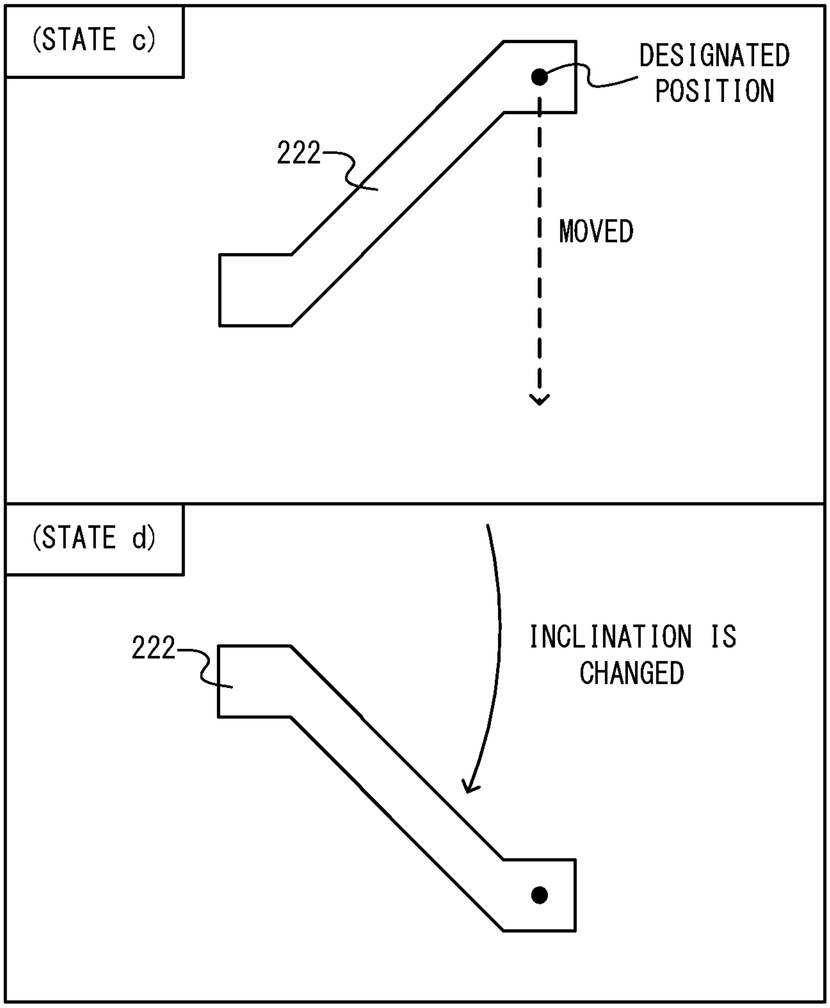
FIG. 13 shows an example of a process of changing inclination of a non-limiting slope object.

FIG. 13 shows an example of a process of changing the inclination of a slope object. In state c shown in FIG. 13, a slope object 222 of placed in a game space. The slope object 222 is a slope object having an oblique side directed upward to the right. Hereinafter, a process of altering the shape of the slope object 222 will be described as an example.

In state c shown in FIG. 13, it is assumed that the user performs an operation of designating the upper continuous portion of the slope object 222 and moving the designated position downward from the position of the upper continuous portion (see FIG. 13). At this time, as in state d shown in FIG. 13, the object placement means 151 alters the shape of the slope object 222 so as to change the inclination of the oblique side of the slope object 222. Specifically, the shape of the slope object 222 is altered such that the oblique side is directed downward to the right. Thus, the object placement means 151 changes the direction of the oblique side of the slope object 222 in accordance with the operation of designating the continuous portion of the slope object 222 and moving the designated position. Although not shown in FIG. 13, in state c, also in the case where an operation of moving the designated position leftward to a position on the left side of the lower continuous portion of the slope object 222 is performed, the object placement means 151 alters the shape of the slope object 222 such that the oblique side is directed downward to the right. It can be said that altering the shape of the slope object 222 from state c to state d is equivalent to inverting the slope object 222.

In the exemplary embodiment, when the shape of the slope object is altered based on the shape-alteration instruction, the object placement means 151 does not change the position of the continuous portion that is not designated by the shape-alteration instruction. That is, even when the shape of the slope object is altered based on the shape-alteration instruction, the position of the continuous portion that is not designated by the shape-alteration instruction remains fixed. This allows the user to easily understand the operation of altering the shape of the slope object, whereby operability is improved.

In the exemplary embodiment, the object placement means 151 places the continuous portion, which is designated by the shape-alteration instruction, in a position closest to the designated position among positions where the continuous portion can be placed. In addition, the object placement means 151 alters the shape of the slope object in real time by changing, in real time, the position of the continuous portion in accordance with the currently designated position. Thus, the shape of the slope object altered according to the shape-alteration instruction can be presented in a way easy to understand for the user.

In FIGS. 12 and 13, the case of altering the shape of a steep slope object has been described as an example. However, the shape of a gentle slope object is also altered based on a shape-alteration instruction, in a similar manner to that for the steep slope object. However, since the length of the unit portion differs between the steep slope object and the gentle slope object, the unit length to be extended/contracted also differs between them. That is, the oblique side of the steep slope object is extended/contracted in units of one cell of the grid in the horizontal direction, while the oblique side of the gentle slope object is extended/contracted in units of two cells of the grid in the horizontal direction.

In the exemplary embodiment, the object placement means 151 does not change a steep slope object to a gentle slope object nor change a gentle slope object to a steep slope object, based on a shape-alteration instruction. That is, the user cannot change the amount of inclination of an oblique side of a slope object by a shape-alteration instruction. As described above, the unit length by which an oblique side can be extended/contracted differs between a steep slope object and a gentle slope object. Therefore, if switching between a steep slope object and a gentle slope object is performed while the user operates a shape-alteration instruction, the unit of extension/contraction of the oblique side of the slope object changes during the operation, which may make the user feel discomfort with the operation. Therefore, in the exemplary embodiment, switching between a steep slope object and a gentle slope object by a shape-alteration instruction is inhibited, whereby operability of the shape-alteration instruction is improved. In another embodiment, the object placement means 151 may switch between a steep slope object and a gentle slope object, based on a shape-alteration instruction.

In the exemplary embodiment, the object placement means 151 places a single slope object in the game space, based on a placement instruction as described above, and changes the single slope object to a multiple slope object, based on a shape-alteration instruction. However, in another embodiment, the object placement means 151 may place a multiple slope object having an oblique side of a predetermined length in the game space, based on a placement instruction, and may change the length of the oblique side of the multiple slope object, based on a shape-alteration instruction. In still another embodiment, the object placement means 151 may place a single slope object in the game space, based on a first placement instruction, and may place a multiple slope object having an oblique side of a predetermined length in the game space, based on a second placement instruction. The game system 1 may be configured to switch between the first placement instruction and the second placement instruction, based on a switching instruction as described above.

[2-5. Deletion Process for Slope Object]

Next, a process of deleting a part of a slope object under a predetermined condition will be described with reference to FIG. 14. In the exemplary embodiment, a slope object has a continuous portion as described above. Since an end of an oblique side of the slope object is continuous to the continuous portion, the continuous portion hinders another component object from being continuous to the oblique side of the slope object. Therefore, in the exemplary embodiment, the deletion means 152 executes a deletion process of deleting the continuous portion of the slope object under a predetermined condition. Thus, the other component object can be made continuous to the oblique side of the slope object. Hereinafter, the deletion process will be described in detail.

Figure 14:
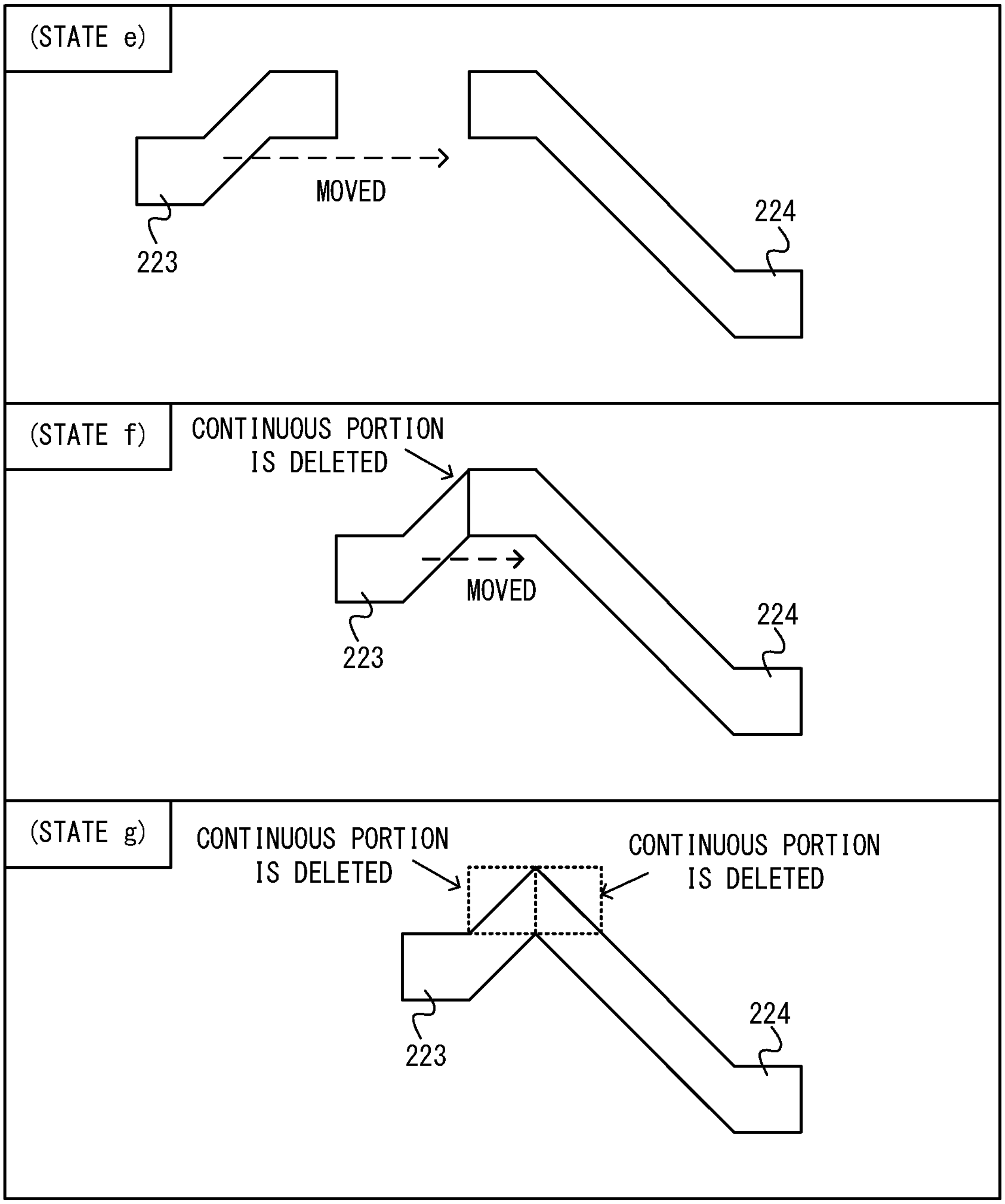
FIG. 14 shows an example of a process of deleting a part of a non-limiting slope object.

FIG. 14 shows an example of a process of deleting a part of a slope object. In FIG. 14, an operation of moving a slope object 223 so as to connect the slope object 223 to a slope object 224 will be described as an example.

In state e shown in FIG. 14, two slope objects 223 and 224 are placed apart from each other. In state e, the user performs a movement instruction to move the slope object 223 toward the slope object 224. The specific content of the operation of the movement instruction is optional. In the exemplary embodiment, the movement instruction is performed by, for example, a drag operation including: designating a unit portion (or a continuous unit portion of a multiple slope object); and moving the designated position on the screen.

A case is considered in which, as the slope object 223 has been moved as shown in state e, an upper continuous portion of the slope object 223 is placed in the same position (i.e., in the same cell) as an upper continuous portion of the slope object 224. In this case, the upper continuous portion of the slope object 223 and the upper continuous portion of the slope object 224 are placed so as to overlap each other. As for the overlapping parts of the two slope objects, the deletion means 152 deletes the part of one of the slope objects. Specifically, the deletion means 152 deletes the upper continuous portion of the slope object 223. As a result, as shown in state fin FIG. 14, the slope objects 223 and 224 are placed such that the oblique side of the slope object 223 is continuous to the upper continuous portion of the slope object 224. That is, through the deletion process, the oblique side of the slope object 223 can be made continuous to the other component object (slope object 224 in this case).

A case is considered in which, as the user has performed a movement instruction to further move the slope object 223 to the right in state f shown in FIG. 14, an end of the oblique side of the slope object 223 is placed in the same position as an end of the oblique side of the slope object 224. In this case, the upper continuous portion of the slope object 224 overlaps the oblique side (in other words, the unit portion) of the slope object 223. If the upper continuous portion of the slope object 223 has not been deleted, the upper continuous portion of the slope object 223 overlaps the oblique side (in other words, the unit portion) of the slope object 224. In the above case, the deletion means 152 deletes the upper continuous portion of the slope object 223, and deletes the upper continuous portion of the slope object 224. As a result, as shown in state g in FIG. 14, the slope objects 223 and 224 are placed such that the oblique side of the slope object 224 is continuous to the oblique side of the slope object 223. That is, through the deletion process, the oblique sides of two slope objects can be made continuous to each other. For example, as shown in FIG. 14, two oblique sides directed in different directions can be made continuous. Alternatively, two oblique sides having different amounts of inclination, such as an oblique side of a steep slope object and an oblique side of a gentle slope object, can be made continuous to each other.

In state f and state g shown in FIG. 14, the two slope objects 223 and 224 are displayed as if they are united. At this time, the game system 1 may manage the two slope objects 223 and 224 as different objects adjacent to each other. Alternatively, the game system 1 may unite the two slope objects 223 and 224 to manage them as a single component object. That is, the game system 1 may store therein component object information for each of the two slope objects 223 and 224, or may store therein component object information for the single component object obtained by uniting them.

In FIG. 14, the case where two slope objects are placed in an overlapping manner has been described as an example. However, also in a case where a slope object and another type of component object (e.g., a block object) are placed in an overlapping manner, the deletion process is executed in a similar manner to that described above. For example, when a continuous portion of a slope object and a part of a pipe object are placed in an overlapping manner, the deletion means 152 deletes the continuous portion that overlaps the pipe object. Thus, the game system 1 can place the component objects such that the oblique side of the slope object is continuous to the pipe object.

In the exemplary embodiment, the object placement means 151 inhibits a placement state in which a unit portion of a slope object overlaps a part of another component object. That is, since such a placement state is avoided in the exemplary embodiment, the deletion means 152 does not execute the deletion process in such a placement state.

As described above, in the exemplary embodiment, in the case where a slope object is placed such as an end of an oblique side thereof is continuous to a side of another component object in the game space, if a part of the slope object overlaps a part of the other component object, the deletion means 152 executes the deletion process of deleting the part of the slope object. In the exemplary embodiment, in the deletion process, the deletion means 152 deletes a continuous portion, of the slope object, that overlaps the other component object. However, in another embodiment, the deletion means 152 may delete the part, of the other component object, that overlaps the part of the slope object. As described above, the game system 1 can make the oblique side of the slope object continuous to the other component object through the deletion process, thereby increasing the degree of freedom in generating terrains. In the exemplary embodiment, since a slope object has a continuous portion when the slope object does not overlap another component object, the slope object is prevented from having an acute angle. Meanwhile, when the slope object overlaps another component object, the continuous portion is deleted. Thus, the degree of freedom in generating terrains can be increased.

In the exemplary embodiment, in the case where the component object, which has been partially deleted through the deletion process, is moved based on an instruction of the user and thereby overlapping of the component object with the other component object is eliminated, the restoration means 153 restores the partially-deleted component object to the state before deletion in the deletion process. For example, in state g shown in FIG. 14, when the slope object 223 is moved and thereby does not overlap the slope object 224, the restoration means 153 restores the slope object 223 to the original shape (i.e., the shape having the upper continuous portion). That is, the restoration means 153 restores the slope object 223 to the shape having the upper continuous portion and places the slope object 223 in the game space. Thus, when overlapping of the slope object is eliminated after execution of the deletion process, the slope object is less likely to have a shape with an acute angle. In addition, since the user does not have to perform an operation to restore the slope object to the original shape, operational convenience can be improved.

[2-6. Complementation Process Regarding Slope Object]

Next, a complementation process regarding a slope object will be described with reference to FIG. 15 to FIG. 18. Since a slope object has an oblique side, the slope object may be placed so as to fill only a part of a cell of the grid. Therefore, if another component object is placed near a slope object in a game space, a region (e.g., a hatched region shown in FIG. 15) smaller than one cell may be generated. If a player object enters such a region, the player object cannot easily escape from the region. Here, such a region is referred to as a "small cell region". When a small cell region is present, two objects may be placed at an interval shorter than one cell, or two objects may be placed so as to abut each other at a point. In this case, the player object may pass through (in other words, slip through) the two objects, without the intention of the user. Therefore, in the exemplary embodiment, in order to reduce the likelihood of generation of a small cell region, the complementing means 154 executes a complementation process under a predetermined condition to place a complementary object. Hereinafter, the complementation process will be described.

Figure 15:
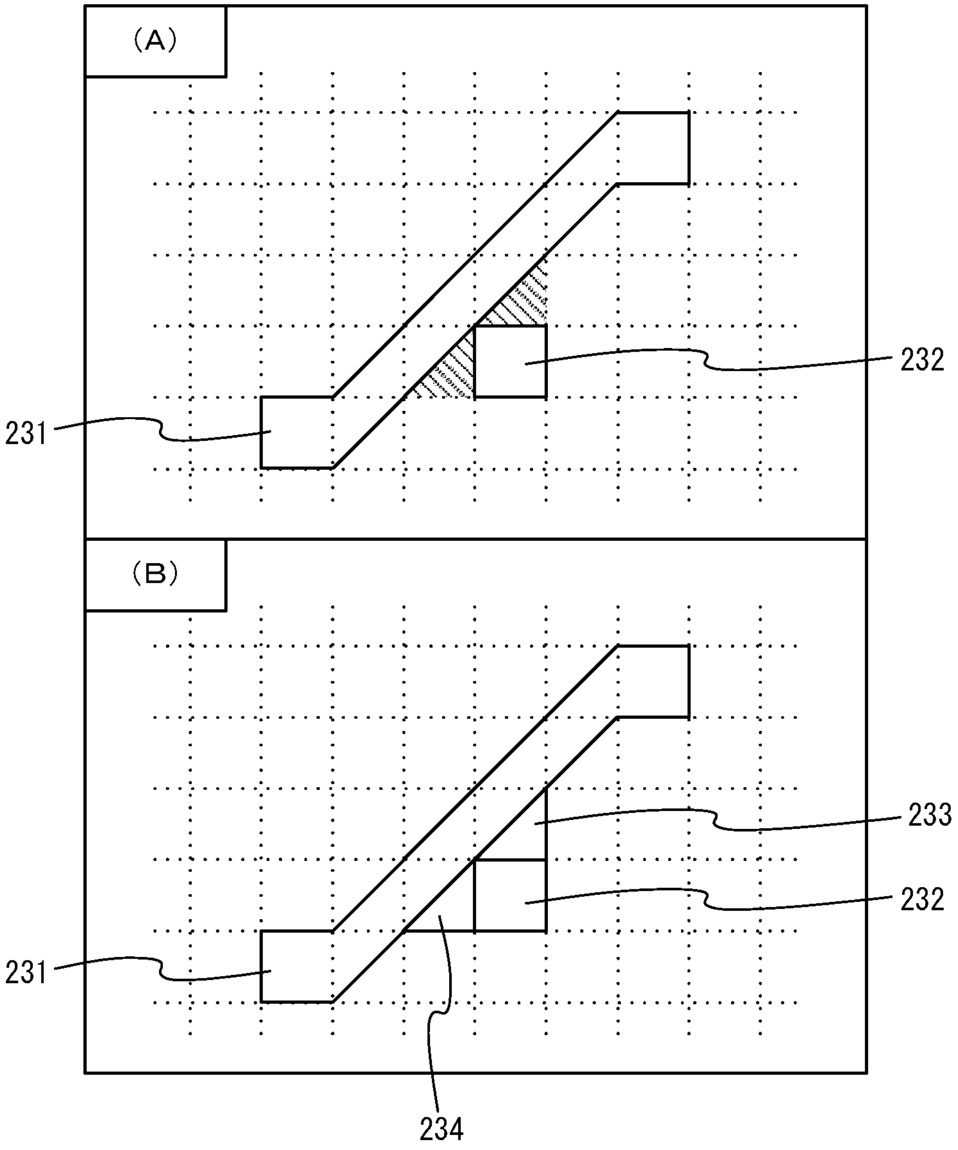
FIG. 15 shows an example of a game space in which a component object is placed near a non-limiting slope object.

FIG. 15 shows an example of a game space in which a component object is placed near a slope object. In FIG. 15, (A) shows a state where no complementary object is placed, and (B) shows a state where complementary objects are placed. In FIG. 15, a case where a block object is placed as an example of the component object near the slope object, will be described as an example.

As shown in FIG. 15, when a block object 232 is placed in the game space, the complementing means 154 sets, as determination target cells, cells within a predetermined complementation determination distance from the cell where the block object 232 is placed. The determination target cells are cells to be determined whether or not to satisfy a complementation condition described below.

In the exemplary embodiment, the complementation determination distance is a distance corresponding to one cell of the grid. That is, in the exemplary embodiment, the complementing means 154 sets, as determination target cells, four cells that are adjacent in the up, down, left, right directions to the cell where the block object 232 is placed. In another embodiment, the complementation determination distance is optional, and may not be a distance corresponding to one cell of the grid. For example, the complementation determination distance may be a distance corresponding to two cells of the grid. The determination target cells are not limited to the four cells that are adjacent in the up, down, left, right directions to the cell where the block object 232 is placed. The complementing means 154 may set, as determination target cells, eight cells surrounding the cell where the block object 232 is placed. In the exemplary embodiment, since the grid is set in the game space, the complementation determination distance is set in units of the cells of the grid. However, in another embodiment, a complementation determination distance may be set in units of any length in the game space.

In FIG. 15, a case where the block object 232 is placed in one cell will be described as an example. However, also in the case where a block object is placed over a plurality of cells, determination target cells are set in a similar manner to that described above. Although not shown in FIG. 15, for example, when a block object having a vertical length corresponding to one cell and a horizontal length corresponding to two cells is placed, six cells in total, which are adjacent in the up, down, left, right directions to the two cells where the block object is placed, are set as determination target cells.

For each of the determination target cells, the complementing means 154 determines whether or not the cell satisfies the complementation condition. In the exemplary embodiment, the complementation condition is that a slope object is placed in a part of the determination target cell. Here, a cell, which is not completely but partially filled with the slope object, is referred to as a "partially-filled cell". The complementation condition in the exemplary embodiment is that the determination target cell is a partially-filled cell. In the example shown in FIG. 15, among the determination target cells, the cell on the block object 232 and the cell to the left of the block object 232 are partially-filled cells. Therefore, these two cells satisfy the complementation condition.

In each of the cells that satisfy the complementation condition, a region where the slope object is absent (the hatched region in FIG. 15) is smaller than the region corresponding to one cell, and is likely to be a small cell region as described above. Therefore, in the exemplary embodiment, the complementing means 154 places a complementary object in this cell to reduce the likelihood of generation of a small cell region. In the example shown in FIG. 15, a complementary object 233 is placed in the cell on the block object 232, and a complementary object 234 is placed in the cell to the left of the block object 232.

Since the slope object is placed in a part of the cell that satisfies the complementation condition, the complementing means 154 places the complementary object so as to fill the rest of the cell. In the example shown in FIG. 15, the complementary objects 233 and 234, each having a shape of a right triangle, are placed. In another embodiment, a complementary object may have any shape. For example, the complementing means 154 may delete a part of the slope object placed in the cell that satisfies the complementation condition, and may place, in this cell, a complementary object as large as the cell. In another embodiment, the complementing means 154 may place a complementary object by changing the shape of the slope object so as to fill the entirety of the cell that satisfies the complementation condition. In this case, a part, of the slope object, which has been added by the shape change can be regarded as the complementary object. Thus, the complementary object may be managed as a part of the slope object.

In the exemplary embodiment, the same texture is attached to the block objects and the slope objects to generate the game image. In addition, the same texture as that attached to the block objects and the slope objects is also attached to the complementary objects to generate the game image. Therefore, as shown in (B) of FIG. 15, when the slope object 231, the block object 232, and the complementary objects 233 and 234 are placed adjacent to each other, the same texture is attached to the respective objects. Thus, even when a complementary object, which is not instructed by the user, is placed, discomfort of the user can be reduced.

Figure 16:
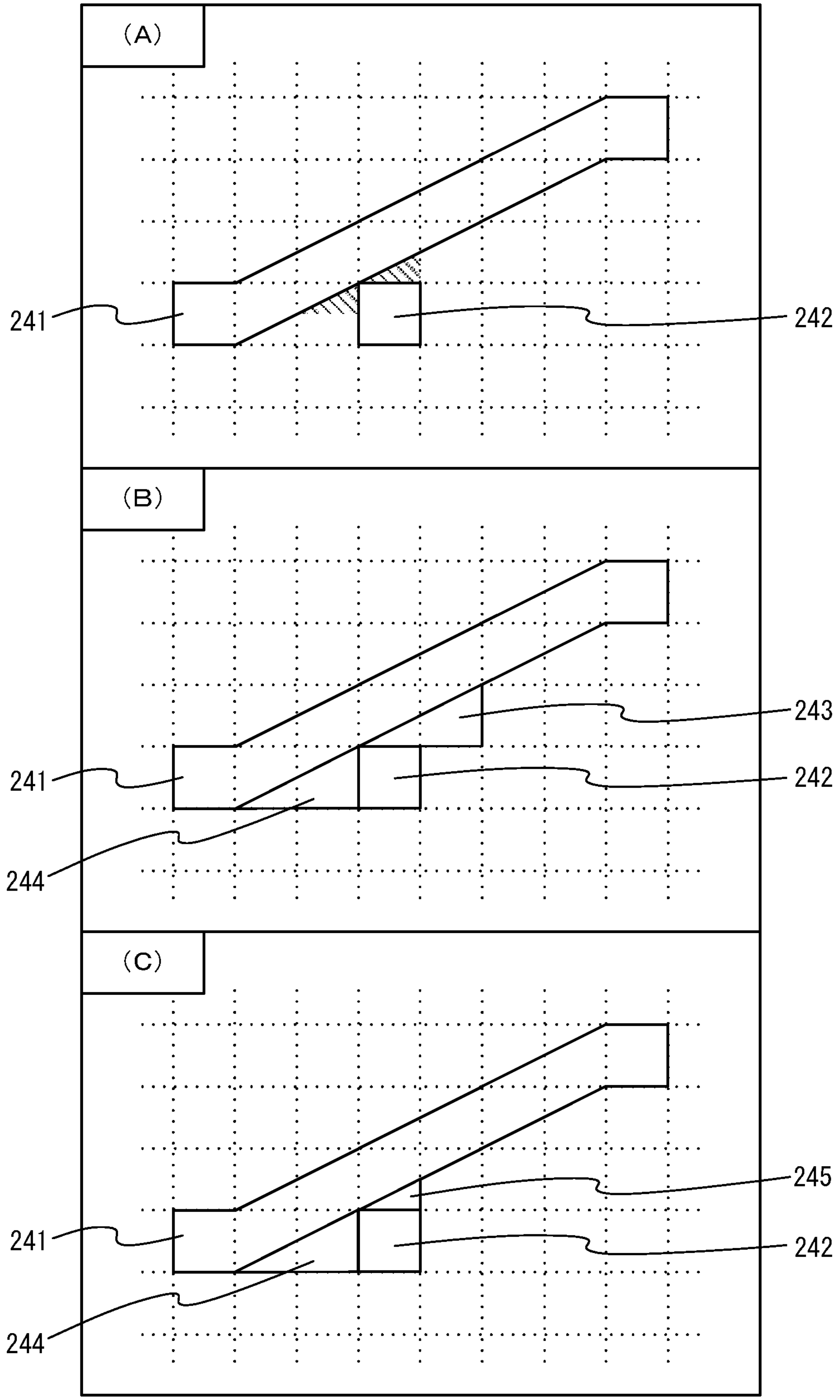
FIG. 16 shows an example of a game space in which a component object is placed near a non-limiting gentle slope object.

FIG. 16 shows an example of a game space in which a component object is placed near a gentle slope object. In FIG. 15, the case where a component object is placed near a steep slope object has been described as an example. Also in the case where a component object is placed near a gentle slope object, if a determination target cell satisfies the complementation condition, a complementary object is placed in the determination target cell. Since the inclination of the oblique side differs between the gentle slope object and the steep slope object, the shape and the placement position of the complementary object differ between the gentle slope object and the steep slope object. Hereinafter, the complementation process in the case shown in FIG. 16 will be described in detail.

In the example shown in FIG. 16, a block object 242 is placed near a gentle slope object 241 ((A) shown in FIG. 16). At this time, as in the case shown in FIG. 15, the complementing means 154 sets, as determination target cells, four cells that are adjacent in the up, down, left, right directions to the cell where the block object 242 is placed. Then, for each of the determination target cells, the complementing means 154 determines whether or not the cell satisfies the complementation condition. In the example shown in FIG. 16, the cell on the block object 242 and the cell to the left of the block object 242 are partially-filled cells, and satisfy the complementation condition.

The complementing means 154 places a complementary object in each of the determination target cells that satisfy the complementation condition. Since the horizontal length of the gentle slope object corresponds to two cells of the grid, there are two partially-filled cells placed side by side in the left-right direction. Therefore, when the slope object placed in the determination target cell is a gentle slope object, this determination target cell and a cell next to the determination target cell are partially-filled cells. In the exemplary embodiment, the complementing means 154 places complementary objects so as to fill the determination target cell that satisfies the complementation condition and the partially-filled cell next to the determination target cell. In the example shown in FIG. 16, a complementary object 243 is placed over the determination target cell on block object 242 and the partially-filled cell next to the determination target cell. In addition, a complementary object 244 is placed over the determination target cell to the left of the block object 242 and the partially-filled cell to the left of the determination target cell (see (B) in FIG. 16).

In the example shown in FIG. 16, it is considered that a region to be a small cell region is a region with acute angles caused by the slope object (the hatched region shown in FIG. 16). Therefore, in another embodiment, the complementing means 154 may place a complementary object so as to fill only the determination target cell. That is, in the example shown in FIG. 16, the complementing means 154 may place, for example, a complementary object 245 having a horizontal length corresponding to one cell of the grid, instead of the complementary object 243 having the horizontal length corresponding to two cells of the grid (see (C) in FIG. 16). Placement of the complementary object 245 also can reduce the likelihood of generation of a small cell region, as in the case of placing the complementary object 243.

Figure 17:
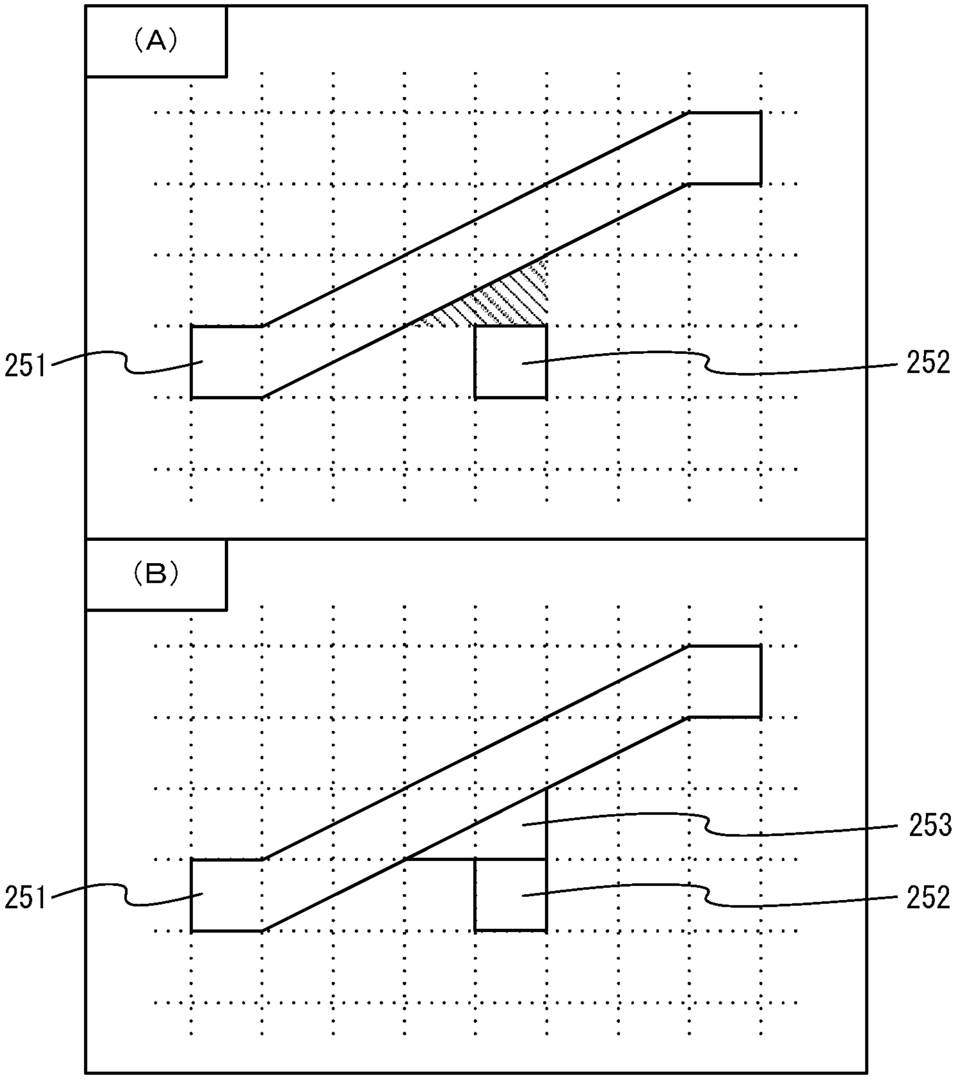
FIG. 17 shows another example of a game space in which a component object is placed near a non-limiting gentle slope object.

FIG. 17 shows another example of a game space in which a component object is placed near a gentle slope object. In the example shown in FIG. 17, a block object 252 is placed in a position different from that in the case of FIG. 16 (specifically, the block object 252 is placed in a cell to the right of the block object 242).

In the example shown in FIG. 17, among the determination target cells, only the cell on the block object 252 is a partially-filled cell, and satisfies the complementation condition. Therefore, the complementing means 154 places a complementary object 253 that fills the cell on the block object 252 and the partially-filled cell to the left of the cell. Thus, in the vicinity of the gentle slope object, only one complementary object may be placed.

Figure 18:
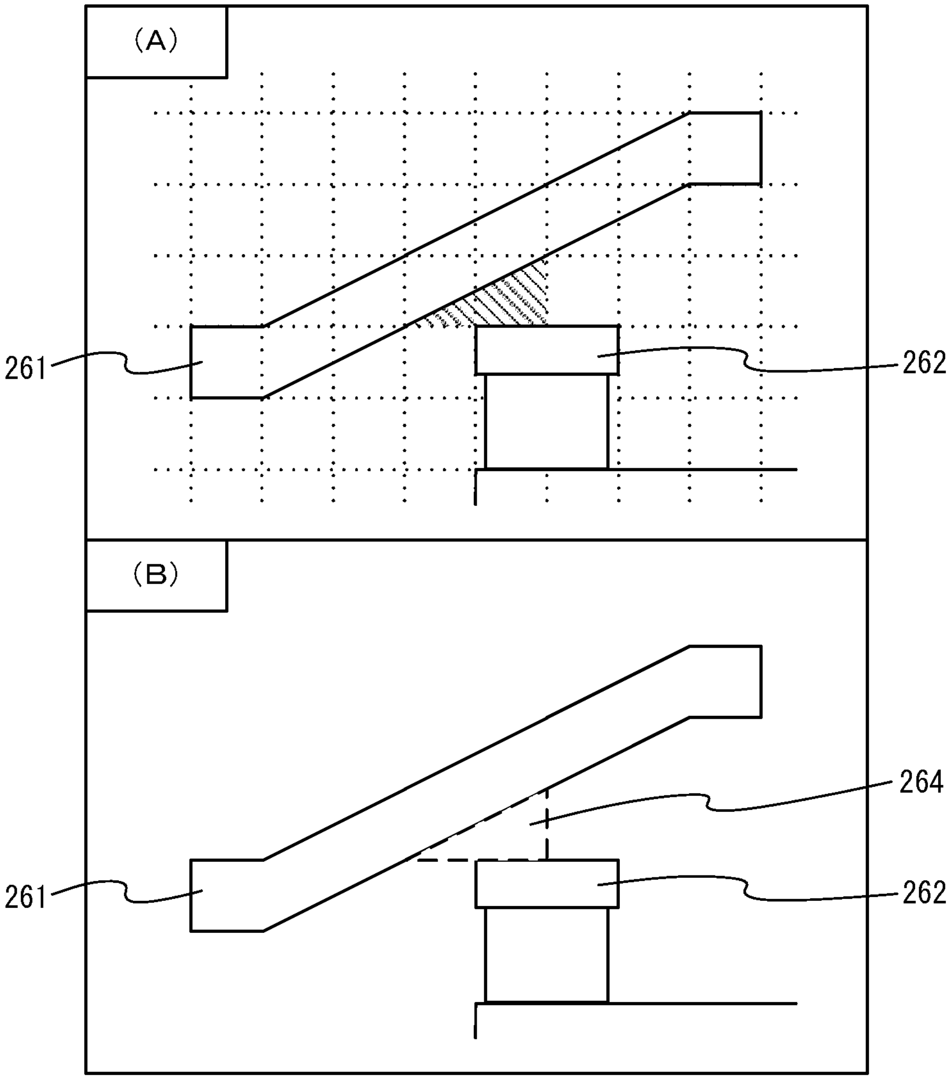
FIG. 18 shows an example of a game space in which another type of component object is placed near a non-limiting slope object.

FIG. 18 shows an example of a game space in which another type of component object is placed near a slope object. In FIG. 18, (A) shows a state where a pipe object 262 is placed near a slope object 261. The example shown in FIG. 18 is different from the examples shown in FIG. 15 to FIG. 17 in that the pipe object 262 is placed near the slope object 261. The pipe object 262 is a component object to which a texture different from that of the slope object is attached.

Also in the case where the pipe object 262 is placed near the slope object 261, a small cell region is likely to be generated as in the case where a block object is placed. Therefore, also in the case where the slope object 261 is placed near the pipe object 262, the complementing means 154 places a complementary object in a similar position (the position of a hatched region in the example shown in (A) of FIG. 18) by a similar manner to that for the case where a block object is placed.

The pipe object is, in contrast to the block object, a component object to which a texture different from that of the slope object is attached. Therefore, in the example shown in FIG. 18, if the same texture as that of the slope object is attached to the complementary object, a component object different in texture from the pipe object is placed on the pipe object, which may make the user feel discomfort. Therefore, in the exemplary embodiment, when the pipe object 262 is placed near the slope object 261, the complementing means 154 places a complementary object that is not displayed (in other words, a transparent complementary object) ((B) of FIG. 18). Thus, the player object is prevented from entering the hatched region shown in (A) of FIG. 18. In addition, since a game image, in which a component object different in texture from the pipe object is placed on the pipe object 262, is not displayed, the likelihood that the user feels discomfort can be reduced.

As described above, a complementary object may be displayed to be visible to the user (in other words, may be displayed as a part of the game image), or may be invisible to the user (in other words, need not be displayed as a part of the game image). In either display mode, the complementary object is used in the collision detection process.

As described above, in the exemplary embodiment, in the case where a predetermined type of component object (e.g., a block object or a pipe object) is placed in the game space, the complementing means 154 determines whether or not a slope object is placed in a part of a determination target cell that is located within a predetermined distance from a cell where the component object is placed. Then, if a slope object is placed in a part of the determination target cell, the complementing means 154 places a complementary object so as to fill the entirety of the determination target cell. Thus, the likelihood of generation of a small cell region in the game space can be reduced. The complementing means 154 may place a complementary object under a predetermined condition when a predetermined type of component object (a block object or a pipe object in the exemplary embodiment) is placed in the game space, and may not place a complementary object when another type of object is placed in the game space.

The complementing means 154 may place a complementary object when a predetermined type of component object is placed near a slope object, and may not place a complementary object when another type of component object is placed near a slope object. Alternatively, the complementing means 154 may place a complementary object when any type of component object is placed near a slope object.

In the exemplary embodiment, if a component object, which has caused placement of a complementary object, is deleted from the game space, moved, or altered in shape, a situation may occur in which the complementation condition is not satisfied. In this case, the complementing means 154 deletes the complementary object. For example, if the block object 232 shown in FIG. 15 is deleted based on an instruction of the user, the complementing means 154 deletes the complementary objects 233 and 234 corresponding to the block object 232. Thus, the game system 1 deletes a complementary object that has become unnecessary due to deletion of a component object, automatically (e.g., without an instruction to delete the complementary object). This saves the user the trouble of performing an operation to instruct deletion of the complementary object, thereby improving operational convenience.

[2-7. Play Mode]

Next, the outline of processing in the play mode will be described with reference to FIG. 19. In the exemplary embodiment, the game system 1 stores (in other words, retains) therein stage information indicating a game space created in the creation mode. For example, in response to a retention instruction made by the user to the aforementioned menu image, the game system 1 stores therein the stage information indicating the game space that has been creased. The stage information includes, for example, information regarding placement of the respective objects in the game space.

The stage information stored in the game system 1 may be uploaded to a server via a network, or may be transmitted to another game system different from the game system 1. At this time, the stage information may be used in the play mode in the other game system.

Figure 19:
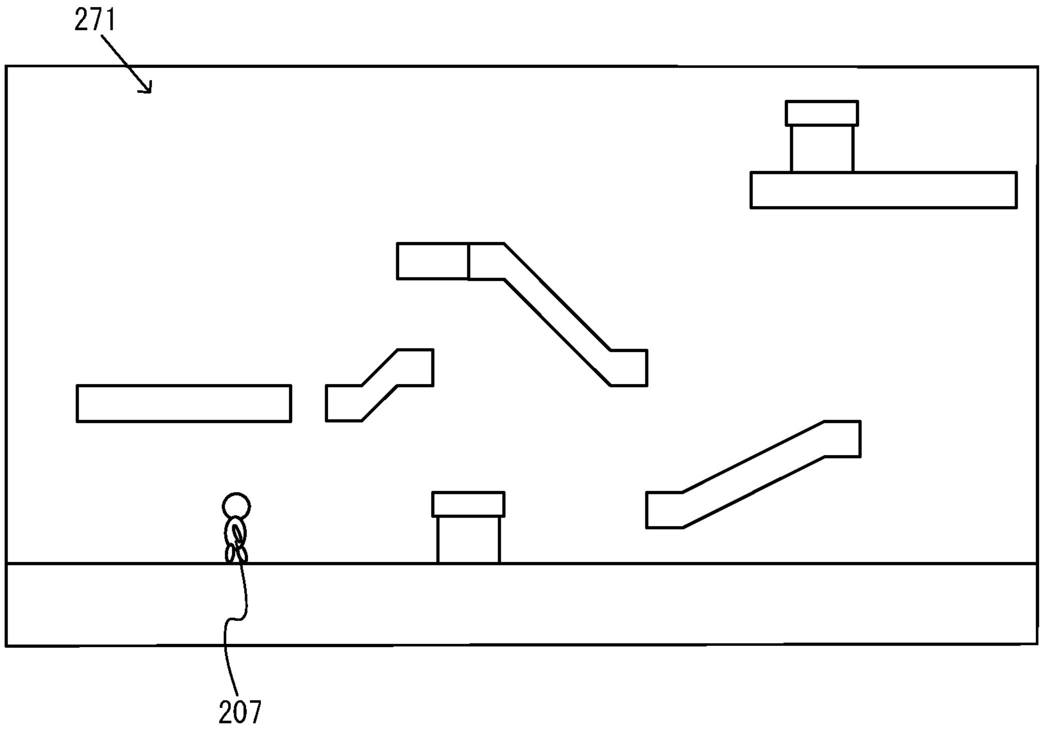
FIG. 19 shows an example of a game image displayed in a play mode.

FIG. 19 shows an example of a game image displayed in the play mode. As shown in FIG. 19, in the play mode, a game space image 271 representing the game space is displayed on the display device. This game space is a game space indicated by the stage information stored in the game system 1. In the play mode, a player object 207 is placed in the game space. In the play mode, the player object control means 156 controls the motion of the player object in the game space in accordance with an instruction of the player. That is, in the play mode, the player can perform a game by using the game space created in the creation mode.

The images used for creating the game space, which are displayed in the creation mode, are not displayed in the play mode. That is, in the play mode, the aforementioned object bar image 202, menu bar image 203, and grid are not displayed. This allows the player to easily view the game space.

3. Specific Example of Processing in Game System

Next, a specific example of information processing in the game system 1 will be described with reference to FIG. 20 to FIG. 24.

[3-1. Data Used for Information Processing]

Figure 20:
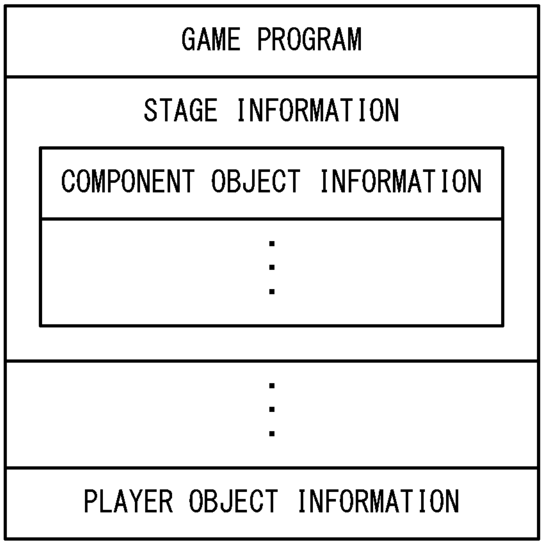
FIG. 20 shows examples of various types of information used for information processing in a non-limiting game system.

FIG. 20 shows examples of various types of information used for the information processing in the game system 1. The various types of information shown in FIG. 20 is stored in a storage medium (e.g., the flash memory 84, the DRAM 85, and/or the memory card attached to the slot 23) accessible by the main body apparatus 2.

As shown in FIG. 20, the game system 1 stores a game program therein. The game program is a program for executing the game of the exemplary embodiment, and is stored in, for example, the flash memory 84 and/or the memory card attached to the slot 23.

As shown in FIG. 20, the game system 1 stores therein the stage information and the aforementioned player object information. These pieces of information (in other words, data) are generated and used in game processing (FIG. 21 to FIG. 23) described below.

The stage information indicates a game space (in other words, a game stage) created in the creation mode. As shown in FIG. 20, the stage information includes the aforementioned component object information. In the exemplary embodiment, the component object information is generated and stored for each object. Although not shown in FIG. 20, the stage information includes information regarding placement of objects (e.g., a player object, an enemy object, an item object, etc.) other than the component object and the complementary object. In addition, the stage information is generated and stored for each stage.

The player object information indicates information regarding the player object during the game play in the play mode. During the game play, in addition to the player object information, information regarding the states and motions of various objects (e.g., an enemy object, an item object, a terrain object, etc.), which move in the game space during the game play, is stored.

[3-2. Processing Executed in Game System]

Figure 21:
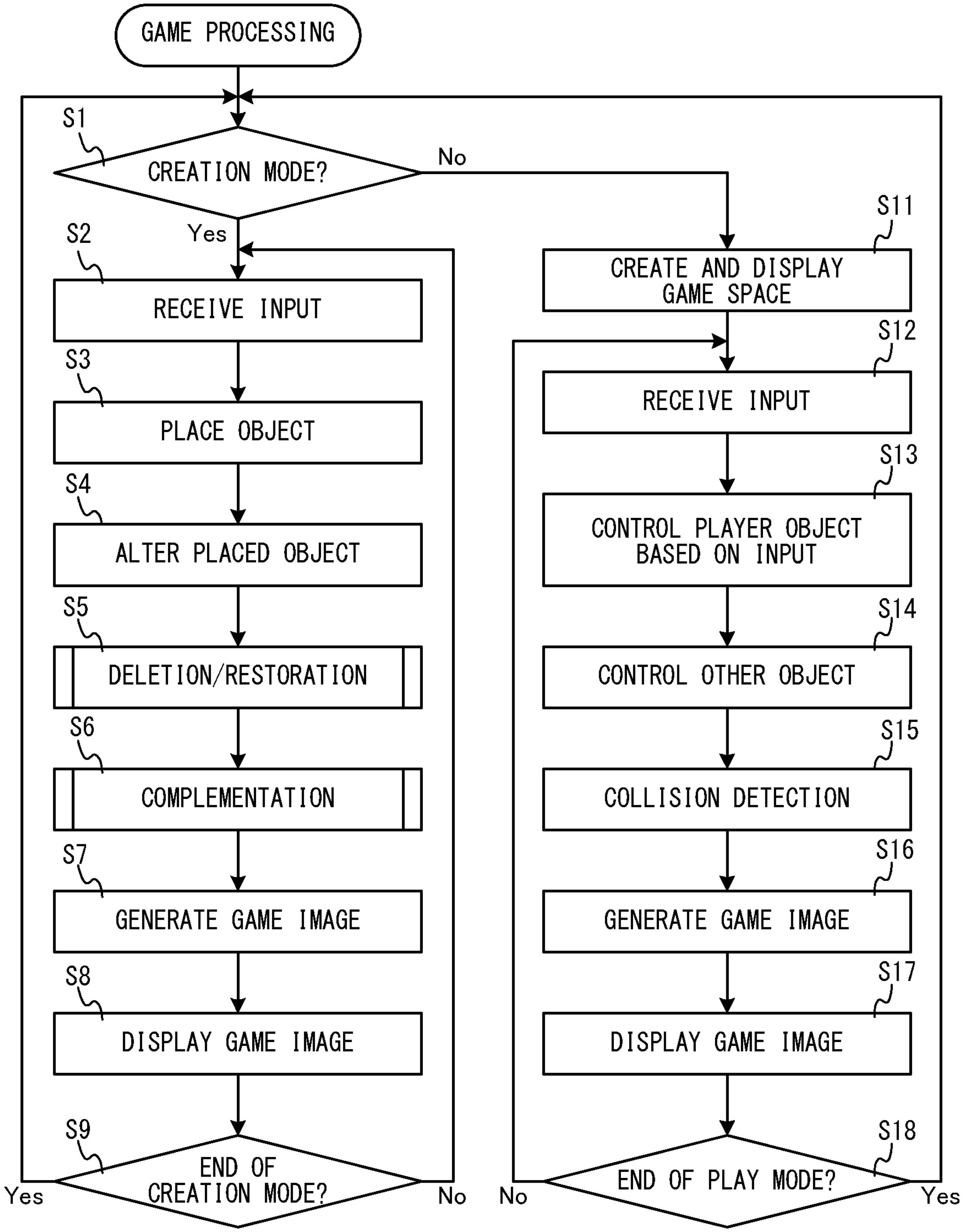
FIG. 21 is a flowchart showing an example of a flow of game processing executed in the non-limiting game system.
Figure 22:
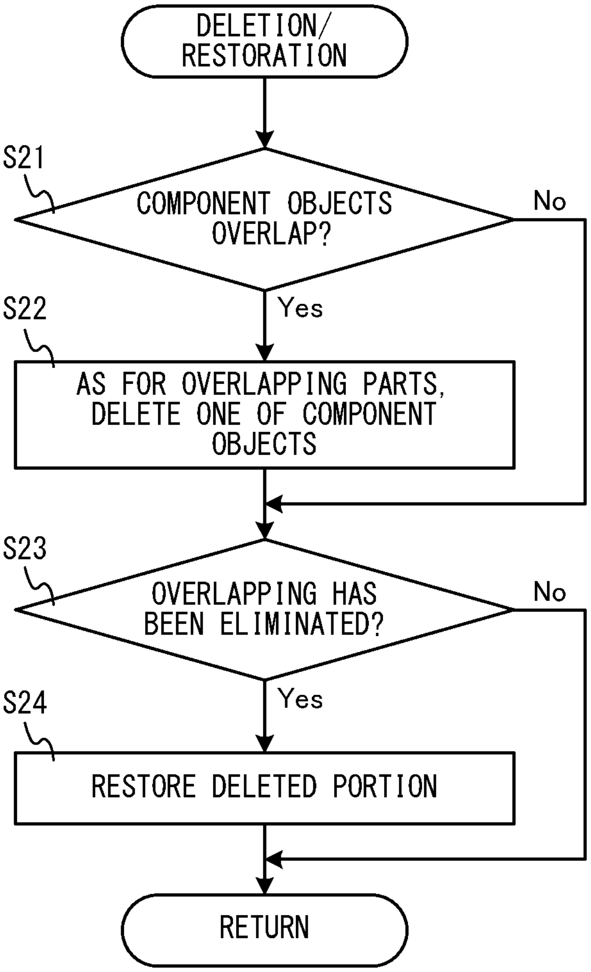
FIG. 22 is a sub flowchart showing an example of a specific flow of a deletion/restoration process in step S5 shown in FIG. 21.
Figure 23:
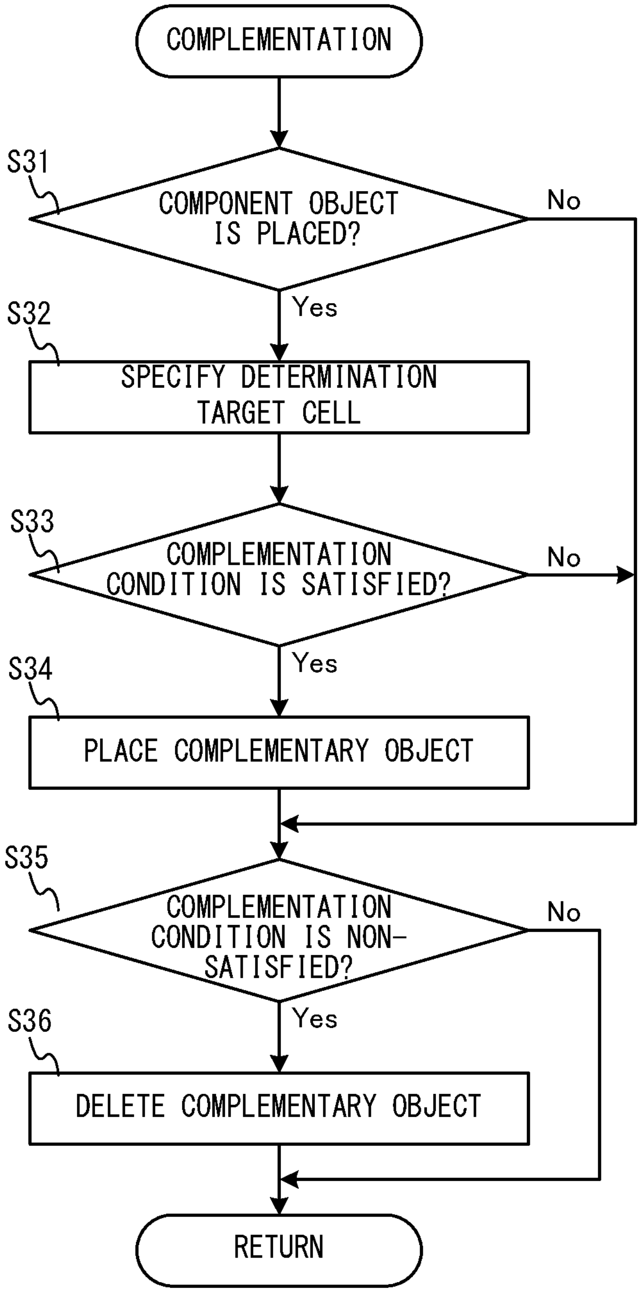
FIG. 23 is a sub flowchart showing an example of a specific flow of a complementation process in step S6 shown in FIG. 21.

FIGS. 21 to 23 are flowcharts showing an example of a flow of game processing executed by the game system 1. The sequential game processing shown in FIGS. 21 to 24 is started in response to the game program being started up by the processor 81.

In the exemplary embodiment, the processor 81 of the main body apparatus 2 executes the game program stored in the game system 1, thereby executing processes in steps shown in FIGS. 21 to 23. However, in another embodiment, some of the processes in the steps may be executed by a processor (e.g., a dedicated circuit) other than the processor 81. When the game system 1 is communicable with another information processing apparatus (e.g., a server), some of the processes in the steps shown in FIGS. 21 to 23 may be executed by the other information processing apparatus. The processes in the steps shown in FIGS. 21 to 23 are merely examples, and as long as the same result is obtained, the order of the processes in the respective steps may be changed, or another process may be executed in addition to (or instead of) the process in each step.

The processor 81 executes the processes in the steps shown in FIGS. 21 to 23 by using a memory (e.g., the DRAM 85). That is, the processor 81 stores information (in other words, data) obtained in the respective process steps in the memory. When the information is to be used in the subsequent process steps, the processor 81 reads out the information from the memory and uses the information.

In step S1 in FIG. 21, the processor 81 determines whether or not to execute the creation mode. In the exemplary embodiment, the processor 81 determines whether to execute the creation mode or the play mode, based on an instruction of the user. That is, when the user has performed an instruction to start the creation mode, the determination result in step S1 is positive. When the user has performed an instruction to start the play mode, the determination result in step S1 is negative. When the determination result in step S1 is positive, the process in step S2 is executed. When the determination result in step S1 is negative, the process in step S11 described below is executed.

In the creation mode, a series of processes in steps S2 to S8 are executed. First, in step S2, the processor 81 receives an input of an instruction by the user. That is, the processor 81 acquires data indicating an input performed on the input section (e.g., the touch panel 13, the buttons, and/or the analog stick) of the game system 1, from the input section. Next to step S2, the process in step S3 is executed.

In step S3, the processor 81 (in other words, the object placement means 151) places objects (e.g., a component object and/or a player object, etc.) based on an instruction of the user. That is, when the instruction received in step S2 is an instruction to place an object, the processor 81 places the object in accordance with the instruction. In the exemplary embodiment, as described in "[2-2. Objects placed in game space]", based on the instruction designating the object to be placed and the placement position, the processor 81 places the designated object in the game space. At this time, the processor 81 stores information indicating the placed object (e.g., the component object information) in the memory. Next to step S3, the process in step S4 is executed.

In step S4, the processor 81 (in other words, the object placement means 151) alters the shape of the component object (e.g., a slope object) placed in the game space, based on an instruction of the user. Specifically, when the instruction received in step S2 is an instruction to move the component object, the processor 81 moves the component object in accordance with the instruction. When the instruction received in step S2 is an instruction to alter the shape of the component object, the processor 81 alters the shape of the component object in accordance with the instruction (see "[2-4. Process of altering shape of slope object]" described above). Meanwhile, when the instruction received in step S2 is an instruction to delete the component object, the processor 81 deletes the component object in accordance with the instruction. In step S4, the processor 81 updates the component object information regarding the altered component object, among the pieces of component object information stored in the memory, so as to indicate the altered state. When the component object is deleted, the processor 81 deletes the component object information regarding the component object. Next to step S4, the process in step S5 is executed.

In step S5, the processor 81 (in other words, the deletion means 152 or the restoration means 153) executes a deletion/restoration process. The deletion/restoration process includes the aforementioned deletion process and restoration process. Hereinafter, the deletion/restoration process will be described in detail with reference to FIG. 22.

FIG. 22 is a sub flowchart showing an example of a specific flow of the deletion/restoration process in step S5 shown in FIG. 21. In the deletion/restoration process, first, in step S21, the processor 81 (in other words, the deletion means 152) determines whether or not overlapping of component objects is generated. For example, when a new component object is placed in step S3 or when the component object is altered in step S4, this component object may be placed so as to overlap with another component object. Specifically, the determination process in step S21 can be performed with reference to the component object information stored in the memory. When the determination result in step S21 is positive, the process in step S22 is executed. When the determination result in step S21 is negative, the process in step S22 is skipped, and the process in step S22 is executed.

In step S22, as for the overlapping parts of the two component objects, the processor 81 (in other words, the deletion means 152) deletes the part of one of the component objects. For example, when a continuous portion of a slope object overlaps a part of another component object, the processor 81 deletes the continuous portion of the slope object (see "[2-5. Deletion process for slope object]" described above). In step S22, the processor 81 updates the component object information regarding the partially-deleted component object, among the pieces of component object information stored in the memory, so as to indicate the state after the deletion. Next to step S22, the process in step S23 is executed.

In step S23, the processor 81 (in other words, the restoration means 153) determines, as for the two component objects placed in an overlapping manner, whether or not the overlapping has been eliminated. The determination process in step S23 can be performed with reference to the component object information stored in the memory. When the determination result in step S23 is positive, the process in step S24 is executed. When the determination result in step S23 is negative, the process in step S24 is skipped, and the processor 81 ends the deletion/restoration process.

In step S24, the processor 81 (in other words, the restoration means 153) restores the part, of the component object whose overlapping has been eliminated, which was deleted through the deletion process (step S22). For example, if a continuous portion of a slope object was deleted because of overlapping of the continuous portion with a part of another component object, the processor 81 restores the continuous portion of the slope object (see "[2-5. Deletion process for slope object]" described above). In the exemplary embodiment, when the deletion process has been executed in step S22, the processor 81 stores, in the memory, component object information including deleted-part information indicating the deleted part of the component object. In step S24, the processor 81 performs the restoration process for the component object with reference to the deleted-part information. In addition, the processor 81 updates the component object information regarding the component object subjected to the restoration process, among the pieces of component object information stored in the memory, so as to indicate the restored state. When the process in step S24 has ended, the processor 81 ends the deletion/restoration process. When the deletion/restoration process in step S5 has ended, the process in step S6 is executed.

In step S6, the processor 81 (in other words, the complementing means 154) executes the aforementioned complementation process. Hereinafter, the complementation process will be described in detail with reference to FIG. 23.

FIG. 23 is a sub flowchart showing an example of a specific flow of the complementation process in step S6 shown in FIG. 21. In the complementation process, first, in step S31, the processor 81 determines whether or not a new component object has been placed in the game space through the process in step S3. When the determination result in step S31 is positive, the process in step S32 is executed. When the determination result in step S31 is negative, the series of processes in steps S32 to S36 are skipped, and the process in step S35 is executed.

In step S32, the processor 81 specifies determination target cells as described above. In the exemplary embodiment, the processor 81 sets, as the determination target cells, cells that are adjacent in the up, down, left, right directions to a cell where the component object is placed (see "[2-6. Complementation process regarding slope object]" described above). Next to step S32, the process in step S33 is executed.

In step S33, the processor 81 determines whether or not the determination target cells set in step S32 satisfy the aforementioned complementation condition. The determination as to whether or not the determination target cells satisfy the complementation condition can be performed with reference to the component object information stored in the memory. If a plurality of determination target cells have been set in step S32, the processor 81 determines whether or not each of the determination target cells satisfies the complementation condition. When at least one determination target cell satisfies the complementation condition, the determination result in step S33 is positive. When none of the determination target cells satisfy the complementation condition, the determination result in step S33 is negative. When the determination result in step S33 is positive, the process in step S34 is executed. When the determination result in step S33 is negative, the process in step S34 is skipped, and the process in step S35 is executed.

In step S34, the processor 81 places a complementary object so as to fill the determination target cell that satisfies the complementation condition. The specific method of placing the complementary object has already been described in the above "[2-6. Complementation process regarding slope object]". In step S34, the processor 81 stores, in the memory, component object information indicating the placed complementary object. In the exemplary embodiment, the processor 81 includes relevant part information, which indicates the component object that has caused the placement of the complementary object, in the component object information regarding the complementary object, and then stores the component object information in the memory. Next to step S34, the process in step S35 is executed.

In step S35, as for the determination target cell that has satisfied the complementation condition, the processor 81 determines whether or not the determination target cell has become non-satisfied. For example, when the component object has been changed (moved, deleted, or altered in shape) in the game space through the process in step S4, the processor 81 determines whether or not the complementation condition has become non-satisfied. This determination can be performed with reference to the component object information stored in the memory. When the determination result in step S35 is positive, the process in step S36 is executed. When the determination result in step S35 is negative, the process in step S36 is skipped, and the processor 81 ends the complementation process.

In step S36, the processor 81 deletes the complementary object. Specifically, the processor 81 deletes the complementary object that has been placed due to the component object changed through the process in step S4. The complementary object to be deleted in the process in step S36 is the complementary object that is indicated by the component object information including the relevant part information that indicates the component object changed through the process in step S4. In addition, the processor 81 deletes, from the memory, the component object information regarding the complementary object to be deleted. When the process in step S36 has ended, the processor 81 ends the complementation process. When the complementation process in step S6 has ended, the process in step S7 is executed.

In step S7 shown in FIG. 21, the processor 81 (in other words, the image generation means 155) generates a game image (see FIG. 9) to be displayed in the creation mode. Specifically, the processor 81 generates a game space image representing a game space by using the stage information stored in the memory, and generates an object bar image and a menu bar image as described above. Next to step S7, the process in step S8 is executed.

In step S8, the processor 81 causes the display device to display the game image generated in step S7. That is, the processor 81 causes the display device to display the game image including the game space image, the object bar image, and the menu bar image. When the processing loop from step S2 to step S9 is repeatedly executed, the process in step S8 is executed every predetermined time period (e.g., every frame period). Next to step S8, the process in step S9 is executed.

In step S9, the processor 81 determines whether or not to end the creation mode. For example, when an instruction to end the creation mode has been made by the user, the processor 81 determines to end the creation mode. When the determination result in step S9 is positive, the process in step S1 is executed again. When the determination result in step S9 is negative, the process in step S2 is executed again. In the exemplary embodiment, the series of processes in steps S2 to S8 in the creation mode are repeatedly executed until the result of the determination process in step S9 becomes positive.

Meanwhile, in the play mode, the series of processes in steps S11 to S18 are executed. First, in step S11, the processor 81 generates a game space image (see FIG. 19) representing a game space of a stage to be played, and causes the display device to display the game space image. A method of determining a stage to be played is optional. For example, a stage to be played is determined according to a selection instruction made by the player. Next to step S11, the process in step S12 is executed.

In step S12, the processor 81 receives an input of an instruction by the player. The process in step S12 is the same as the process in step S2 described above. Next to step S12, the process in step S13 is executed.

In step S13, the processor 81 (in other words, the player object control means 156) controls the motion of the player object in the game space, based on an input made by the player. At this time, the processor 81 stores, in the memory, player object information regarding the player object whose motion has been controlled. Next to step S13, the process in step S14 is executed.

In step S14, the processor 81 controls the motions of objects other than the player object. For example, the processor 81 controls the motions of an enemy object and an item object in accordance with an algorithm defined in the game program in advance. Next to step S14, the process in step S15 is executed.

In step S15, the processor 81 executes a collision detection process. Specifically, the processor 81 detects a collision between various objects placed in the game space. For this collision detection, at least a component object as described above is used. For example, in the exemplary embodiment, the processor 81 detects a collision between a player object and a component object placed in the game space. This collision detection can be performed with reference to the stage information and the player object information stored in the memory. When it is detected that the two objects collide with each other, the processor 81 causes the objects to take motions according to the collision, as appropriate. At this time, the processor 81 stores, in the memory, player object information regarding the player object whose motion has been controlled. Next to step S15, the process in step S16 is executed.

In step S16, the processor 81 generates a game image. Specifically, the processor 81 generates a game space image representing a game space, by using the stage information and the player object information stored in the memory. Next to step S16, the process in step S17 is executed.

In step S17, the processor 81 causes the display device to display the game image generated in step S16. That is, the processor 81 causes the display device to display the game space image representing a state in which the player object operated by the player moves in the game space. When the processing loop from step S12 to step S18 is repeatedly executed, the process in step S17 is executed every predetermined time period (e.g., every frame period). Next to step S17, the process in step S18 is executed.

In step S18, the processor 81 determines whether or not to end the play mode. For example, when an instruction to end the play mode has been made by the player, the processor 81 determines to end the play mode. When the determination result in step S18 is positive, the process in step S1 is executed again. When the determination result in step S18 is negative, the process in step S12 is executed again. In the exemplary embodiment, the series of processes in steps S12 to S18 in the play mode are repeatedly executed until the result of the determination process in step S18 becomes positive.

Although not shown in the figures, when an end instruction to end the game processing has been made by the user during the game processing shown in FIGS. 21 to 23, the processor 81 ends the game processing shown in FIGS. 21 to 23. The processor 81 may receive the end instruction at any timing during the game processing.

4. Function and Effect of Exemplary Embodiment, and Modifications

As described above, the information processing program (i.e., the game program) according to the exemplary embodiment causes component objects used for collision detection to be placed in a game space, based on an instruction of the user, and is executed in a computer of the information processing apparatus (i.e., the main body apparatus 2). The information processing program causes the computer to function as the following means:

- object placement means configured to place, as a component object, a slope object having a unit portion in the game space, based on an instruction of the user; and
- image generation means configured to generate an image representing the game space in which the component object is placed.

The object placement means places, as the slope object, a first slope object having one unit portion (i.e., a single slope object) in the game space, based on a first instruction of the user (e.g., a placement instruction to place the slope object). In addition, the object placement means places, as the slope object, a second slope object having a plurality of unit portions (i.e., a multiple slope object) in the game space, based on a second instruction of the user (e.g., a shape-alteration instruction to alter the shape of the slope object). The second slope object includes a continuous unit portion in which a plurality of unit portions are continuous such that a plurality of oblique sides (each being a first side in the example shown in FIG. 24) are continuous to form one side (FIG. 10).

As described above, the information processing apparatus can easily create a plurality of types of slope objects having different lengths of oblique sides by using different numbers of unit portions. Further, in the above exemplary embodiment, the length of the oblique side of the slope object is adjusted by connecting the unit portions. Therefore, when the oblique side is lengthened, the space in which the slope object is placed can be reduced as compared with the case where a slope object having a single shape (e.g., a right triangle slope object) is extended or contracted to adjust the length of the oblique side of the slope object. According to the above exemplary embodiment, since the space in which the slope object is placed is reduced, other objects can be easily placed in the game space, whereby the degree of freedom in placing the objects can be increased.

In the above exemplary embodiment, a unit portion is configured as follows. FIG. 24 shows an example of a unit portion. In FIG. 24, (a) shows a unit portion according to the above exemplary embodiment. As shown in (a) of FIG. 24, the unit portion according to the above exemplary embodiment has a first portion and a second portion. The first portion has a first side and a second side, and an interior angle formed by the first side and the second side is an acute angle. The second portion has a continuous side that is continuous to a vertex of the angle formed by the first side and the second side. The second portion has a side including at least a part of the second side. An interior angle formed by the continuous side and the first side is 90° or more.

In the above exemplary embodiment, the first portion is a right triangle, the second side and a third side of the first portion are placed parallel to the grid lines, and the first side of the first portion is an oblique side. Thus, the slope object is placed such that the first side of the unit portion thereof is placed along a diagonal line of a quadrangle composed of one or more cells of the grid, and the second side thereof is placed along a side of the cell.

As described above, the unit portion according to the above exemplary embodiment is configured to have the second portion in addition to the first portion having an acute angle part. The second portion allows the acute angle part of the first portion to have an angle of 90° or more, thereby reducing the likelihood of occurrence of the problem caused by presence of an acute angle. Therefore, in the above exemplary embodiment, the collision detection process can be facilitated, and thus the processing load in the game system 1 and the work load on the developer can be reduced.

In the above exemplary embodiment, the unit portion is a parallelogram having the first side and the second side. Therefore, in the above exemplary embodiment, the continuous unit portion is a parallelogram (see FIG. 10), and thus the game system 1 can place the slope object having two oblique sides. Further, in the above exemplary embodiment, the space in which the slope object is placed can be reduced as compared with the case where a unit portion as shown in (b) of FIG. 24 is used.

In this specification, for the purpose of making the exemplary embodiment and modifications thereof easy to understand, a slope object is described for each of portions thereof (e.g., a unit portion and continuous portions, or a first portion and a second portion), and a straight line corresponding to an edge of each portion is called a "side". However, as is apparent from the above description, a side is not necessarily an edge of the slope object, and the slope object need not be separable (in other words, separable into portions) at a side. For example, the slope object need not be separable at the side A or the side B shown in FIG. 10, and the unit portion of the slope object need not be separable into two parts at the second side shown in FIG. 24.

(Modifications Regarding Shape of Slope Object)

In another embodiment, the shape of the unit portion is not limited to a parallelogram, and may be any other shape. In FIG. 24, (b) shows a unit portion of a slope object according to a modification of the exemplary embodiment. As shown in (b) of FIG. 24, the unit portion according to the modification has a trapezoidal shape. The unit portion according to the modification is placed such that two sides respectively connected to both ends of a first side as an oblique side are parallel to the grid lines in the up-down direction, and a side facing the oblique side is parallel to the grid lines in the left-right direction.

Specifically, a first portion of the unit portion according to the modification has the same shape as the first portion of the unit portion according to the above exemplary embodiment. A second portion of the unit portion according to the modification has a square shape which is different from the shape of the second portion of the unit portion according to the above exemplary embodiment. However, like the second portion according to the above exemplary embodiment, the second portion according to the modification also has a continuous side that is continuous to a vertex of an angle formed by the first side and the second side. The second portion has a side including at least a part of the second side. An interior angle formed by the continuous side and the first side is 90° or more. Therefore, as in the above exemplary embodiment, the second portion according to the modification can eliminate an acute angle of the first portion.

In the exemplary embodiment, the slope object is configured to have two continuous portions (i.e., the upper continuous portion and the lower continuous portion). In another embodiment, the slope object need not have continuous portions, or may have one continuous portion.

Figure 25:
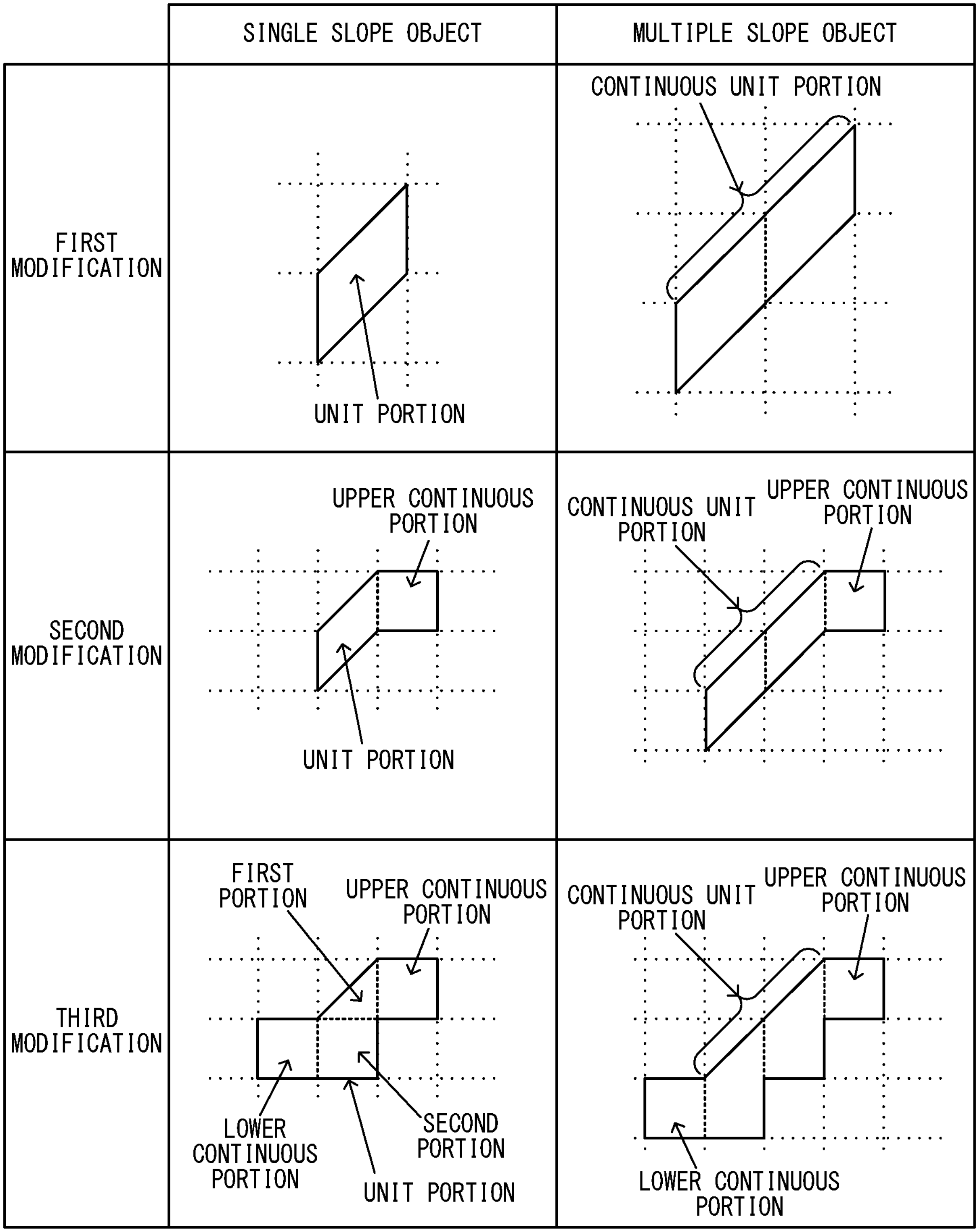
FIG. 25 shows examples of modifications of non-limiting slope objects.

FIG. 25 shows examples of modifications of slope objects. As in the first modification shown in FIG. 25, a slope object may have a shape having no continuous portions. That is, a single slope object may be composed of one unit portion, and a multiple slope object may be composed of a plurality of unit portions (in other words, a continuous unit portion).

In the first modification, the slope object has two acute angles, and the number of the acute angles is the same as that of the object (i.e., a right triangle object) having only the first portion as a unit portion. However, since the two acute angles of the slope object according to the first modification are positioned on opposite sides to each other (i.e., at an upper end and a lower end), even when another object approaches the unit portion, the other object is less likely to come close to both the acute angles. For example, in the state where the player object is placed on the upper oblique side of the slope object shown in FIG. 25, the player object is unlikely to come close to the lower acute angle of the slope object. Meanwhile, in the state where the player object is placed on the oblique side of the right triangle object, since the player object is likely to come close to the acute angles at both ends of the oblique side, the likelihood of occurrence of the problem caused by the acute angles is higher than in the first modification. As described above, according to the first modification, the position of the acute angle in the slope object can be changed by the second portion, thereby reducing the likelihood of occurrence of the problem caused by presence of an acute angle in the game space.

As in the second modification shown in FIG. 25, a slope object may have a shape having only one continuous portion (specifically, an upper continuous portion). That is, a single slope object may be composed of one unit portion and one upper continuous portion, and a multiple slope object may be composed of a plurality of unit portions (in other words, a continuous unit portion) and one upper continuous portion. According to the second modification, since the lope object has the continuous portion, the number of acute angles generated in the slope object can be reduced, thereby reducing the likelihood of generation of an acute angle part in the game space.

As in the third modification shown in FIG. 25, a slope object may have two continuous portions even when an unit portion thereof has a trapezoidal shape. Although not shown in FIG. 25, even when the unit portion has a trapezoidal shape, the slope object may be composed of one continuous portion (e.g., an upper continuous portion) and the unit portion, or may be composed of only the unit portion.

Also in the first to third modifications, as in the exemplary embodiment, the space in which the slope object is placed can be reduced, thereby increasing the degree of freedom in placing objects in the game space.

In the above exemplary embodiment, the unit portions of the two types of slope objects have "vertical length, horizontal length" corresponding to "1 cell, 1 cell" and "1 cell, 2 cells", respectively. That is, as for either of the two types of slope objects, a positive integer, which divides both the number of cells in the vertical direction in a quadrangle whose diagonal line corresponds to the oblique side (in other words, the first side) of the unit portion and the number of cells in the horizontal direction in the quadrangle, is only "1". Accordingly, in the case where a slope object is placed in units of cells, the game system 1 can change, in minimum units, the length of an oblique side (specifically, an oblique side having an inclination corresponding to a vertical-to-horizontal ratio of 1:1 or 1:2) of the slope object by changing the number of unit portions. Thus, the degree of freedom in placing slope objects can be increased, and consequently, the game space can be effectively utilized.

In another embodiment, a unit portion of a slope object may have "vertical length, horizontal length" corresponding to "2 cells, 3 cells" or "3 cells, 4 cells". Thus, the game system can change, in minimum units, the length of an oblique side, of the slope object, having an inclination corresponding to a vertical to horizontal ratio of 2:3 or 3:4.

(Modification Regarding Operation to Slope Object)

In the above exemplary embodiment, the object placement means 151 inverts a slope object, based on an instruction of the user (see FIG. 13). In another embodiment, the object placement means 151 may rotate a slope object in addition to inverting the slope object. For example, in the case where the grid is composed of square cells as in the above exemplary embodiment, the object placement means 151 may rotate the slope object at angles of 90°, based on an instruction of the user. This further increases the degree of freedom in placing the slope object.

(Modification Regarding Game Space)

In the above exemplary embodiment, the case where a two-dimensional slope object is placed in a two-dimensional game space has been described as an example. In another embodiment, the game system 1 may place a three-dimensional slope object in a three-dimensional game space. For example, the object placement means 151 may place a columnar solid object, which has a predetermined height and a bottom surface having the shape of the slope object according to the exemplary embodiment, as a slope object in a three-dimensional game space. This slope object is placed such that the direction of the height is parallel to the direction of the depth of the game space. Thus, the above exemplary embodiment is also applicable to the case where a three-dimensional slope object is placed in a three-dimensional game space. In the case where a three-dimensional slope object is placed in a three-dimensional game space, the game system 1 may generate a game image viewed in a line-of-sight direction that is fixedly set (i.e., this game image is substantially a two-dimensional game image).

In the above exemplary embodiment, the case where a slope object is placed in a game space used for a game has been described as an example. In another embodiment, a virtual space in which a slope object is placed is not limited to a game space, and may be any virtual space in which objects used for collision detection are placed. That is, a slope object and a virtual space in which the slope object is placed may be those used in information processing other than game processing.

The above exemplary embodiment is applicable to, for example, a game system and/or a game program for the purpose of facilitating a collision detection process or the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.)

What is claimed is:

1. A non-transitory computer readable storage medium having stored therein an information processing program to be executed by a computer processor of an information processing apparatus, the computer processor being configured to place a component object to be used for collision detection in a virtual space, based on an instruction of a user, the information processing program causing the computer processor to execute:

placing a slope object having a unit portion, as the component object in the virtual space, based on the instruction of the user; and generating an image representing the virtual space in which the component object is placed, the computer processor placing a first slope object having one unit portion, as the slope object in the virtual space, based on a first instruction of the user, the unit portion having a first portion and a second portion, the first portion having a first side and a second side that form an interior angle being an acute angle, the second portion having a continuous side that is continuous to a vertex of the angle formed by the first side and the second side, and having a side including at least a part of the second side, wherein an interior angle formed by the continuous side and the first side is 90° or more, and the computer processor placing a second slope object as the slope object in the virtual space, based on a second instruction of the user, the second slope object having a continuous unit portion in which a plurality of the unit portions are connected such that a plurality of the first sides thereof are connected to form a single side.

2. The non-transitory computer readable storage medium according to claim 1, wherein the first portion of the unit portion has a third side, and an interior angle formed by the first side and the third side is an acute angle, and the slope object further includes a first continuous portion having a continuous side that is continuous to an end of a side including the first side of the slope object, and is continuous to the third side of the unit portion and having a side including at least a part of the third side, wherein an interior angle formed by the continuous side and the side including the first side is 90° or more.

3. The non-transitory computer readable storage medium according to claim 2, wherein the continuous side that is continuous to the first side and to the third side is perpendicular to a gravity direction of the virtual space.

4. The non-transitory computer readable storage medium according to claim 1, wherein the slope object further includes a second continuous portion having a continuous side that is continuous to an end of a side including the first side of the slope object, is continuous to the second side of the unit portion, and is perpendicular to a gravity direction of the virtual space.

5. The non-transitory computer readable storage medium according to claim 1, wherein in a case where the slope object is placed in the virtual space such that an end of a side including the first side of the slope object is continuous to a side of another component object, if a part of the slope object overlaps a part of the another component object, the information processing program causes the computer processor to execute a deletion process of deleting the part of the slope object or the part of the another component object.

6. The non-transitory computer readable storage medium according to claim 5, wherein the first portion of the unit portion has a third side, and an interior angle formed by the first side and the third side is an acute angle, and the slope object further includes a first continuous portion having:

a continuous side that is continuous to an end of a side including the first side of the slope object, and is continuous to the third side of the unit portion;

a side including at least a part of the third side; and an interior angle formed by the continuous side and the side including the first side being 90° or more, the slope object further includes a second continuous portion having a continuous side that is continuous to an end of a side including the first side of the slope object, is continuous to the second side of the unit portion, and is perpendicular to a gravity direction of the virtual space, and the computer processor, in the deletion process, deletes the first continuous portion or the second continuous portion, of the slope object, which overlaps the another component object.

7. The non-transitory computer readable storage medium according to claim 5, wherein in a case where the component object, which has been partially deleted through the deletion process, is moved based on an instruction of the user and consequently the overlapping with the another component object is eliminated, the information processing program causes the computer processor to execute restoration of the component object, which has been partially deleted, to a state before deletion in the deletion process.

8. The non-transitory computer readable storage medium according to claim 1, wherein the computer processor changes the number of the unit portions included in the slope object placed in the virtual space, based on an instruction of the user.

9. The non-transitory computer readable storage medium according to claim 1, wherein the unit portion is a parallelogram having the first side and the second side.

10. The non-transitory computer readable storage medium according to claim 1, wherein the computer processor places the component object such that vertices of the component object are positioned at intersections of a grid that is set in the virtual space.

11. The non-transitory computer readable storage medium according to claim 10, wherein the information processing program further causes the computer processor to execute:

when a predetermined type of component object is placed in the virtual space, determining whether or not a slope object is placed in a determination target cell that is located within a predetermined distance from a cell of the grid where the predetermined type of component object is placed; and when the slope object is placed in a part of the determination target cell, placing a complementary object as a component object so as to fill an entirety of the determination target cell.

12. The non-transitory computer readable storage medium according to claim 10, wherein the grid is composed of a plurality of square cells, and the computer processor inverts or rotates the component object within the virtual space, based on an instruction of the user.

13. The non-transitory computer readable storage medium according to claim 10, wherein the computer processor places the slope object such that the first side of the unit portion is placed along a diagonal line of a quadrangle composed of one or more cells of the grid, and the second side is placed along a side of the cell.

14. The non-transitory computer readable storage medium according to claim 13, wherein a positive integer, which divides both the number of cells in a vertical direction in the quadrangle whose diagonal line corresponds to the first side of the unit portion and the number of cells in a horizontal direction in the quadrangle, is only 1.

15. The non-transitory computer readable storage medium according to claim 1, wherein the information processing program further causes the computer processor to execute causing a player object placed in the virtual space to move in the virtual space in which the component object is placed, based on an instruction of a player.

16. The non-transitory computer readable storage medium according to claim 1, wherein the computer processor places, as the component object, a two-dimensional object or a three-dimensional object in the virtual space.

17. An information processing apparatus configured to place a component object to be used for collision detection in a virtual space, based on an instruction of a user, the apparatus comprising at least one computer processor and a memory, the computer processor placing a slope object having a unit portion, as the component object in the virtual space, based on the instruction of the user, and generating an image representing the virtual space in which the component object is placed, the computer processor placing a first slope object having one unit portion, as the slope object in the virtual space, based on a first instruction of the user, the unit portion having a first portion and a second portion, the first portion having a first side and a second side that form an interior angle being an acute angle, the second portion having a continuous side that is continuous to a vertex of the angle formed by the first side and the second side, and having a side including at least a part of the second side, wherein an interior angle formed by the continuous side and the first side is 90° or more, and the computer processor placing a second slope object as the slope object in the virtual space, based on a second instruction of the user, the second slope object having a continuous unit portion in which a plurality of the unit portions are connected such that a plurality of the first sides thereof are connected to form a single side.

18. An information processing system configured to place a component object to be used for collision detection in a virtual space, based on an instruction of a user, the system comprising at least one computer processor and a memory, the computer processor placing a slope object having a unit portion, as the component object in the virtual space, based on the instruction of the user, and generating an image representing the virtual space in which the component object is placed, the computer processor placing a first slope object having one unit portion, as the slope object in the virtual space, based on a first instruction of the user, the unit portion having a first portion and a second portion, the first portion having a first side and a second side that form an interior angle being an acute angle, the second portion having a continuous side that is continuous to a vertex of the angle formed by the first side and the second side, and having a side including at least a part of the second side, wherein an interior angle formed by the continuous side and the first side is 90° or more, and the computer processor placing a second slope object as the slope object in the virtual space, based on a second instruction of the user, the second slope object having a continuous unit portion in which a plurality of the unit portions are connected such that a plurality of the first sides thereof are connected to form a single side.

19. An information processing method to be executed in an information processing system configured to place a component object to be used for collision detection in a virtual space, based on an instruction of a user, the information processing system placing a slope object having a unit portion, as the component object in the virtual space, based on the instruction of the user, and generating an image representing the virtual space in which the component object is placed, the information processing system placing a first slope object having one unit portion, as the slope object in the virtual space, based on a first instruction of the user, the unit portion having a first portion and a second portion, the first portion having a first side and a second side that form an interior angle being an acute angle, the second portion having a continuous side that is continuous to a vertex of the angle formed by the first side and the second side, and having a side including at least a part of the second side, wherein an interior angle formed by the continuous side and the first side is 90° or more, and the information processing system placing a second slope object as the slope object in the virtual space, based on a second instruction of the user, the second slope object having a continuous unit portion in which a plurality of the unit portions are connected such that a plurality of the first sides thereof are connected to form a single side.

* * * * *